(12) United States Patent
Elezzabi et al.

(10) Patent No.: US 11,353,764 B2
(45) Date of Patent: Jun. 7, 2022

(54) ELECTROCHROMIC DEVICE

(71) Applicant: The Governors of the University of Alberta, Edmonton (CA)

(72) Inventors: Abdulhakem Elezzabi, Edmonton (CA); Hai Zeng Li, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 0 days.

(21) Appl. No.: 16/798,762

(22) Filed: Feb. 24, 2020

(65) Prior Publication Data

US 2020/0301232 A1    Sep. 24, 2020

(30) Foreign Application Priority Data

Mar. 1, 2019   (CA) ................................ CA 3035398

(51) Int. Cl.
| | |
|---|---|
| *G02F 1/15* | (2019.01) |
| *G02F 1/03* | (2006.01) |
| *G02F 1/153* | (2006.01) |
| *G09G 3/19* | (2006.01) |
| *G09G 3/38* | (2006.01) |
| *G02F 1/1524* | (2019.01) |
| *G02F 1/163* | (2006.01) |

(52) U.S. Cl.
CPC ............ *G02F 1/1524* (2019.01); *G02F 1/163* (2013.01)

(58) Field of Classification Search
CPC ........ C09K 9/02; B60R 1/088; H04N 9/3137; H04N 9/22; G02F 1/155; G02F 1/1523; G02F 1/1525; G02F 1/1521; G02F 1/1533; G02F 1/03; G02F 1/0316; G02F 3/16; G02F 1/163
USPC ................ 359/265–275, 277, 245–247, 242; 345/49, 105, 107; 248/817; 438/929
See application file for complete search history.

(56) References Cited

U.S. PATENT DOCUMENTS

2013/0201546 A1\*   8/2013   Berland ................ G02F 1/1533
                                                                 359/275
2017/0059957 A1\*   3/2017   Garcia .................. G02F 1/1525
(Continued)

OTHER PUBLICATIONS

S. Cong et al; Single-crystalline tungsten oxide quantum dots for fast pseudocapacitor and electrochromic applications; Advanced Materials 26(25), 4260-4267 (2014).
(Continued)

*Primary Examiner* — Dawayne Pinkney
(74) *Attorney, Agent, or Firm* — Nathan V. Woodruff

(57) ABSTRACT

An electrochromic (EC) device comprises a first electrode and a second electrode separated by an electrolyte. The first electrode comprises an electrochromic (EC) layer comprising a compound having the formula $A_iB_jO_k$, where A comprises one or more elements selected from a group consisting of W, Mn, Mo, Co, Ni, Cs, and Zn, where B is different than A and comprises one or more elements selected from a group consisting of Mo, Ti, Nb, and V, where i and j have values that are greater than 0, and where k is a stoichiometric value that balances the formula. A is selected such that the EC layer has an improved optical contrast relative to $B_jO_k$ and B is selected such that the EC layer has an improved specific charge capacity relative to $A_iO_k$.

33 Claims, 15 Drawing Sheets

(56) References Cited

U.S. PATENT DOCUMENTS

2017/0108752 A1* 4/2017 Milliron ................ G02F 1/1524
2017/0369771 A1* 12/2017 Kim ........................ G02F 1/157

OTHER PUBLICATIONS

J. Zhao et al; Trace H2O2-Assisted High-Capacity Tungsten Oxide Electrochromic Batteries with Ultrafast Charging in Seconds; Angewandte Chemie International Edition 55(25), 7161-7165 (2016).
Y. Tian et al; Synergy of W18O49 and polyaniline for smart supercapacitor electrode integrated with energy level indicating functionality; Nano Letters 14(4), 2150-2156 (2014).
G. Cai et al; Inkjet printed large area multifunctional smart windows; Advanced Energy Materials 7(14), 1602598 (2017).
J. Wang et al; A bi-functional device for self-powered electrochromic window and self-rechargeable transparent battery applications; Nature Communications 5(1) 4921 (2014).
S. Cao et al; A visible light-near-infrared dual-band smart window with internal energy storage; Joule 3(4), 1152-1162 (2019).
S. Zhang et al; Al3+ intercalation/de-intercalation-enabled dual-band electrochromic smart windows with a high optical modulation, quick response and long cycle life; Energy & Environmental Science 11(10), 2884-2892 (2018).
P. Yang et al; Large-Scale Fabrication of Pseudocapacitive Glass Windows that Combine Electrochromism and Energy Storage; Angewandte Chemie International Edition 53(44), 11935-11939 (2014).
Y. Zhan et al; Ti-Doped WO3 synthesized by a facile wet bath method for improved electrochromism; Journal of Materials Chemistry C 5(38), 9995-10000 (2017).

* cited by examiner

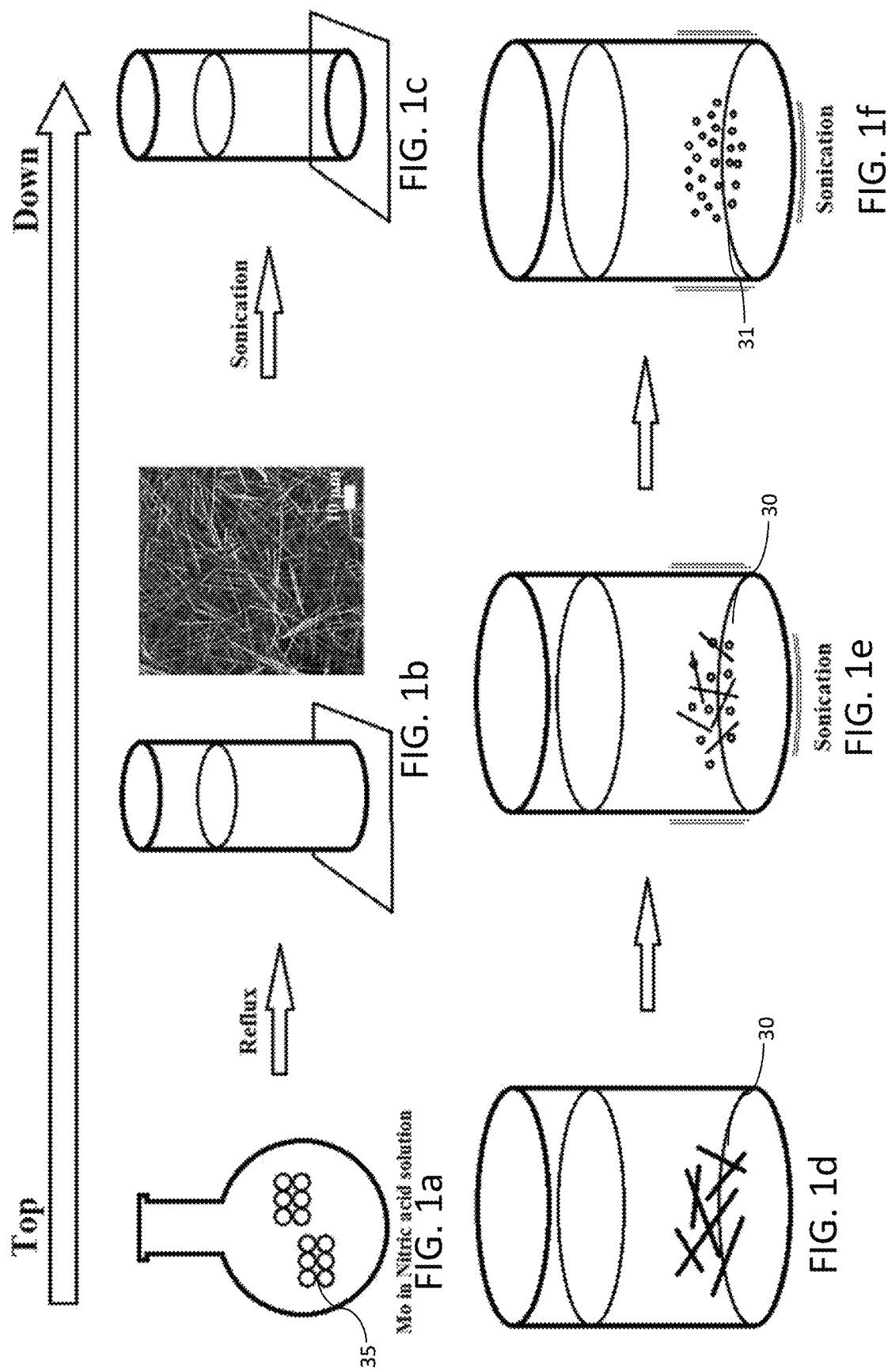

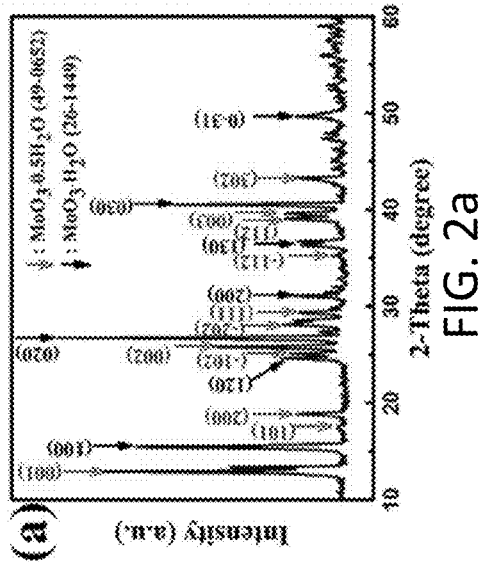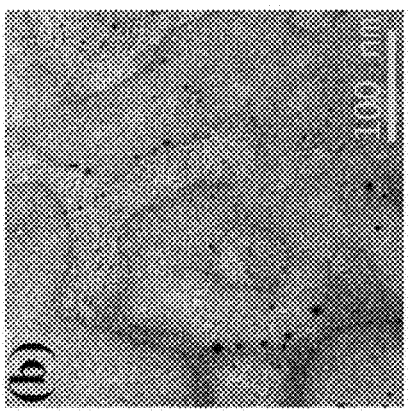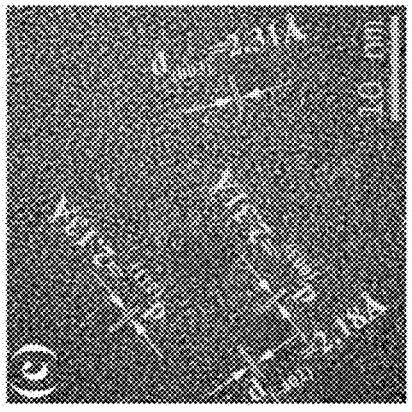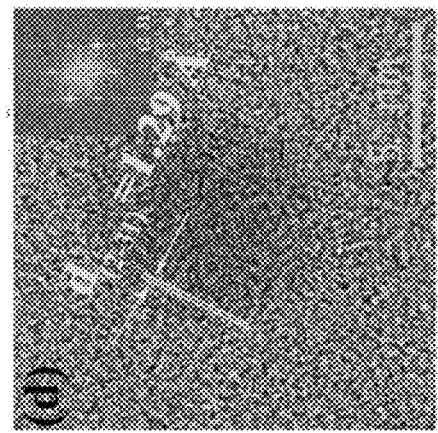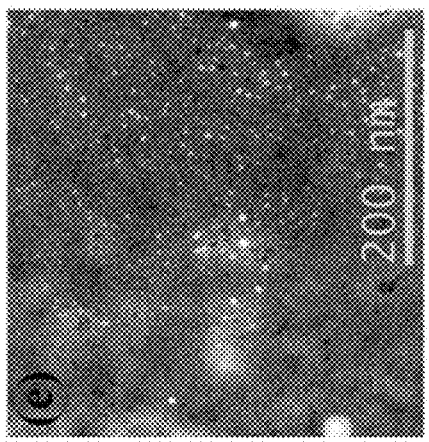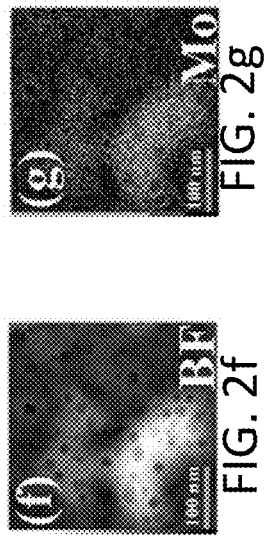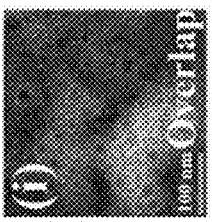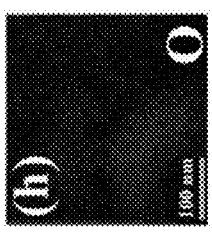

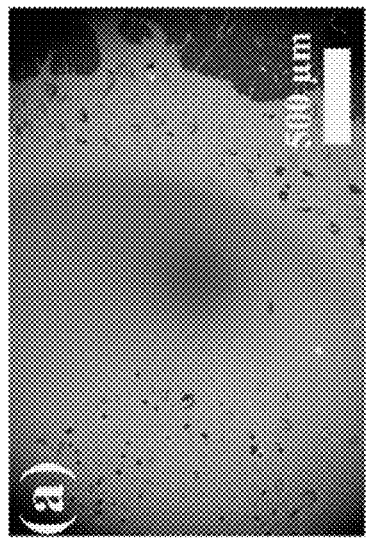
FIG. 10a
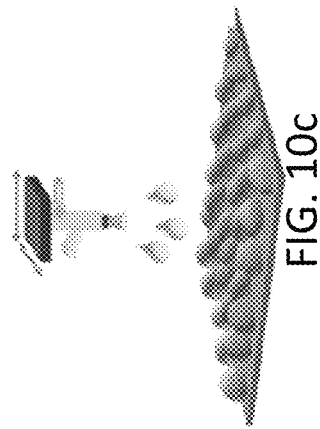
FIG. 10b
FIG. 10c
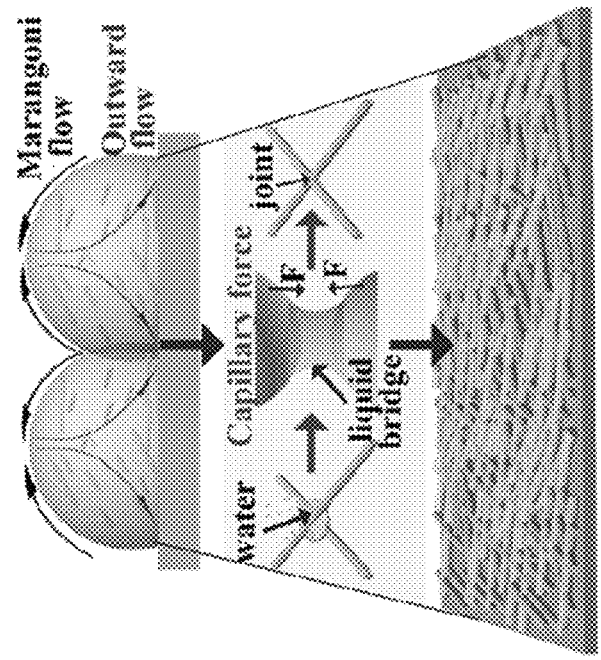
FIG. 10d
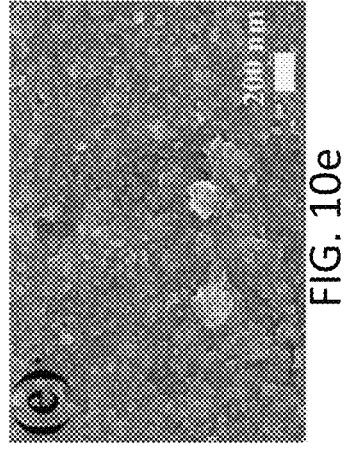
FIG. 10e

ELECTROCHROMIC DEVICE

TECHNICAL FIELD

This relates to an electrochromic (EC) device, namely, an EC that changes optical states and stores charge.

BACKGROUND

An electrochromic material is an electrochemically active substance whose light transmission and absorption can be readily and reversibly controlled on the application of a voltage bias. Transition-metal oxides (TMOs), such as such as tungsten ($WO_3$), molybdenum ($MoO_3$), titanium ($TiO_2$), iridium ($IrO_2$), nickel (NiO), and vanadium ($V_2O_5$) oxides, when intercalated/deintercalated with guest ions (e.g., $Li^+$, $K^+$, $H^+$), have emerged as promising candidates for electrically-controlled colour transforming transparent electrodes. High light modulation contrast entails the presence of strong intervalence charge-transfer optical transitions induced by electron-transfer reactions (redox).

Similar to electrochromic materials, materials employed in electrochemical energy storing rely on faradaic reactions, where energy is stored electrochemically via redox reactions. Electrical charge is stored in a thin surface layer of the TMO electrode by means of rapid intercalation/deintercalation processes. During the charging phase, ions are injected into the TMO layers, whereas, during the discharging phase, ions move back to the counter electrode, thereby providing electrical current flow. In this respect, high energy storage capacity entails a material having a high intrinsic capacity.

While electrochromism and electrochemical energy storing phenomena are different manifestations of electrochemically-triggered activation via ion transport into TMO electrodes, their similarity in terms of both physical and chemical working principles (i.e., redox reaction process and ion transport) points to the fact that electrochromic devices and energy storage devices can be integrated into a single platform by means of a multi-functional electrochromic energy-storing material. A possible application of this technology is a dual-function smart glass for windows and digital displays. A smart window offers privacy and control of daylight and heat, while at the same time can be discharged to power household devices or to light up the indoor environment at night.

Among the group of TMOs, $WO_3$ has been identified as the material of choice for dynamic smart window applications due to its excellent electrochromic performance. However, the theoretical specific capacity of $WO_3$ is relatively low, thereby limiting the energy density of $WO_3$-based electrochromic energy storing devices. Similar to $WO_3$, $MoO_3$ can also switch from transparent to blue during conversion reactions with $Li^+$ ions, with the added advantage that it exhibits a superior theoretical specific capacity. This is due to the ability of the $Mo^{6+}/Mo^{4+}$ redox to exchange 2 electrons per metal atom. Thus, $MoO_3$ has drawn interest as an attractive electrode material for $Li^+$ ion intercalation, one with the potential to store even more energy when incorporated into an electrochromic energy storing device. However, the poor kinetics of $Li^+$ ion diffusion in $MoO_3$ films and the extensive destruction of the structure caused by large-volume expansion during the lithiation and delithiation processes have hindered its practical applications in electrochromic and energy storage devices, Although some strategies have been adopted to overcome these aforementioned limitations and to realize the energy storage capability of $MoO_3$, the electrochromic issue of $MoO_3$ electrodes remains an unresolved challenge.

Devices that incorporate electrochromic phenomena and energy storage functionalities in a single platform, such as energy-efficient smart windows, self-powered displays, and batteries with a human-readable output, are examples of innovative technologies with great potential. Although a variety of Li-ion electrochemical activation processes have dominated and largely shaped the development of modern day rechargeable batteries and electrochromic devices, there are significant concerns over their high-cost and operational risks. To mitigate these issues, interest has been growing in utilizing alternative electropositive ions for electrochromism and electrical energy storage. Compared with typically employed monovalent ions, such as $H^+$, $Li^+$, and $Na^+$, multivalent-ion (e.g. $Mg^{2+}$, $Al^{3+}$) are expected to open up new opportunities for multifunctional electrochromic devices exhibiting high-energy-density storage. This is due to the fact that in such devices, a single multivalent ion can provide multiple charges compared to a monovalent ion. Another key advantage is that several multivalent ions are compatible with aqueous electrolytes, which are desirable for operational safety, low production costs, and high-rate capabilities (i.e. rapid charge kinetics). Previous studies have focused on $Al^{3+}$ ion activated aqueous electrochromic batteries because of its three-electron redox reaction, and its small ionic radius for ease of intercalation. However, Al plating of the anode in an aqueous solution introduces a major challenge due to the high redox potential of $Al^{3+}/Al$ (−1.68V versus standard hydrogen electrode (SHE)).

To circumvent this challenge, $Zn^{2+}$ ions are a promising alternative for the realization of aqueous electrochromic batteries, by virtue of the relatively low redox potential of $Zn^{2+}/Zn$ (−0.76V versus SHE) and the high gravimetric capacity of Zn (820 mAh/g). As such, the $Zn^{2+}$ ions are expected to offer a low-cost, safe, and rechargeable aqueous electrochromic battery with the necessary high-rate capabilities demanded by future technologies. In terms of cathode materials for Zn-ion electrochromic batteries (ZIEBs), $WO_3$-based nanomaterials are considered to be the most promising candidates, due to their excellent electrochromic performance, including high optical contrast ratios and superior cycling stability. However, the slow solid-state diffusion process of divalent ions in $WO_3$ has been a key challenge that needs to be first overcome. To date, there have been no reports regarding the activation of $WO_3$-based cathodes via $Zn^{2+}$ ion intercalation.

SUMMARY

According to an aspect, there is provided an electrochromic (EC) device comprising a first electrode and a second electrode separated by an electrolyte. The first electrode comprises an electrochromic (EC) layer comprising a compound having the formula $A_iB_jO_k$, where A comprises one or more elements selected from a group consisting of W, Mn, Mo, Co, Ni, Cs, and Zn, where B is different than A and comprises one or more elements selected from a group consisting of Mo, Ti, Nb, and V, where i and j have values that are greater than 0, and where k is a stoichiometric value that balances the formula. A is selected such that the EC layer has an improved optical contrast relative to $B_jO_k$ and B is selected such that the EC layer has an improved specific charge capacity relative to $A_iO_k$.

According to other aspects, the EC device may comprise one or more of the following elements, alone or in combination: A may comprise W and B may comprises Mo; the compound may have the chemical formula $W_{0.71}Mo_{0.29}O_3$; A and B may be selected such that the EC layer has an optical contrast of at least 40% between a charged and an uncharged state, and a specific charge capacity of at least 40 mAh/g; the second electrode may comprise a second EC layer; the compound of the EC layer may comprise nanostructured particles; the EC layer further comprises an additive compound, where the additive compound may be $C_lO_m$ such that the first EC layer has a formula $C_lO_m$-$A_iB_jO_k$, where, C comprises one or more elements selected from a group consisting of W, Mn, Mo, Co, Ni, Cs, Zn, Ti, Nb, and V, l has a value of greater than 0, and m is a stoichiometric value that balances the formula, and $C_lO_m$ may selected to increase the specific charge capacity of the EC layer relative to $A_iB_jO_k$; the additive compound may comprise nanostructured particles, and may comprise nanostructured $W_{0.71}Mo_{0.29}O_3$ particles having at least one dimension that is less than or equal to 1 µm and the additive compound comprises nanostructured $MoO_3$ particles having at least one dimension that is less than or equal to 1 µm; the additive compound may comprise an organic compound; at least one of the first electrode, the second electrode, and the electrolyte may comprises an organic compound; the EC device may store a potential difference; and the EC device may transition from an uncharged state to a charged state via thermal activation.

According to an aspect, there is provided, in combination, an electrochromic (EC) device as defined above, and a voltage source connected to selectively apply a potential difference between the first electrode and the second electrode such that applying the voltage source to the first and second electrodes causes the EC device to enter a charged state, and changes an optical state of the EC.

According to other aspects, the combination may comprise one or more of the following elements, alone or in combination: there may be an electrical device selectively connected between the first electrode and the second electrode, such that connecting the electrical device between the first and second electrode discharges the EC device reverses the optical state of the EC device and puts the EC device into a discharged state, where the electrical device may be a light emitting diode; and there may be a controller programmed to selectively connect and disconnect the voltage source and the electrical device.

According to an aspect, there is provided a method of changing an optical state of an electrochromic (EC) device having a first optical state and a second optical state, the method comprising the steps of:

providing an electrochromic (EC) device comprising:
a first electrode and a second electrode separated by an electrolyte, the first electrode comprises an electrochromic (EC) layer comprising a compound having the formula $A_xB_yO_n$, where A comprises an element selected from a group consisting of W, Mn, Mo, Co, Ni, Cs, and Zn, and x has a value that is greater than 0, and where B comprises an element selected from a group consisting of Mo, Ti, Nb, and V and y has a value that is greater than 0, and n is a stoichiometric value that balances the formula;
wherein A is selected such that the EC layer has an improved optical contrast relative to $B_jO_k$ and B is selected such that the EC layer has an improved specific charge capacity relative to $A_iO_k$;
switching the EC from the first optical state to the second optical state by causing electrical current to flow from the first electrode to the second electrode; and switching the EC device from the second optical state to the first optical state by causing electrical current to flow from the second electrode to the first electrode.

According to other aspects, the method may comprise one or more of the following elements, alone or in combination: causing electrical current to flow may comprise powering an electrical device with charge stored in the EC device, which may be a light emitting diode; causing electrical current to flow may comprise applying a voltage difference from a voltage source between the first electrode and second electrode; an optical contrast of the first optical state may be at least 40% greater or less than an optical contrast of the second optical state, and the specific charge capacity of the EC layer is at least 40 mAh/g; A may comprise W and B may comprise Mo; the compound may have the chemical formula $W_{0.71}Mo_{0.29}O_3$; A and B may be selected such that the EC layer has an optical contrast of at least 40% between the charged and the uncharged state, and a specific charge capacity of at least 40 mAh/g; the second electrode may comprise a second EC layer; the compound of the first EC layer may comprise nanostructured particles; the EC layer may further comprise an additive compound; the additive compound may be $C_lO_m$ such that the first EC layer has a formula $C_lO_m$-$A_iB_jO_k$, where, C comprises one or more elements selected from a group consisting of W, Mn, Mo, Co, Ni, Cs, Zn, Ti, Nb, and V, l has a value of greater than 0, and m is a stoichiometric value that balances the formula, and $C_lO_m$ may be selected to increase the specific charge capacity of the EC layer relative to $A_iB_jO_k$; the additive compound may comprise nanostructured particles; the additive compound may comprise nanostructured $W_{0.71}Mo_{0.29}O_3$ particles having at least one dimension that is less than or equal to 1 µm and the additive compound comprises nanostructured $MoO_3$ particles having at least one dimension that is less than or equal to 1 µm; and the additive compound may comprise an organic compound.

According to an aspect, there is provided a method of fabricating an electrochromic (EC) device comprising the steps of:

providing a conductive substrate comprising a conductive layer;

providing a suspension of an electrochromic (EC) compound in a liquid, the EC compound having the formula $A_xB_yO_n$, where A comprises an element selected from a group consisting of W, Mn, Mo, Co, Ni, Cs, and Zn, and x has a value that is greater than 0, and where B comprises an element selected from a group consisting of Mo, Ti, Nb, and V and y has a value that is greater than 0, and n is a stoichiometric value that balances the formula;

coating the conductive layer with the suspension of the EC compound;

forming a first electrode by evaporating the liquid to form a solid EC layer from the EC compound on top of the conductive layer; and providing a second electrode opposite to the first electrode relative to an electrolyte such that the electrolyte is adjacent to the EC layer.

According to an aspect, the method may comprise one or more of the following elements, alone or in combination: coating the conductive layer with the suspension of the EC compound may comprise drop-casting, spray-coating, or dip coating; the suspension of the EC compound may comprise nanostructured particles suspended in liquid; evaporating the liquid may comprise annealing the solid EC layer; the suspension of the EC compound may be formed by mixing one or more precursor chemical solutions in the liquid; the conductive substrate may be transparent; the method may further comprise the step of mixing the suspension of the EC compound with a suspension of an additive compound, the additive compound may have a formula $C_lO_m$ where C comprises one or more elements selected from a group consisting of W, Mn, Mo, Co, Ni, Cs, Zn, Ti, Nb, and V, l has a value of greater than 0, and m is a stoichiometric value that balances the formula; $C_lO_m$ may be selected to increase the specific charge capacity of the EC layer relative to $A_iB_jO_k$; the method may further comprise the step of alternating coating layers of the EC compound and an additive compound; the additive compound may comprise an organic compound, and the organic compound may be poly(3,4-ethylenedioxythiophene) polystyrene sulfonate; A may comprise W and B may comprise Mo; the EC compound may the chemical formula $W_{0.71}Mo_{0.29}O_3$; A and B may be selected such that the EC layer has an optical contrast of at least 40% between a charged and an uncharged state, and a specific charge capacity of at least 40 mAh/g; providing the second electrode may comprise forming a second EC layer.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1a depicts the step of adding Mo powder to $HNO_3$ solution in the procedure to synthesize aqueous colloidal $MoO_3$.

FIG. 1b depicts the step of forming a suspension in the procedure to synthesize aqueous colloidal $MoO_3$.

FIG. 1c depicts the clear solution in the procedure to synthesize aqueous colloidal $MoO_3$.

FIG. 1d is a schematic of the particles in the solution before sonication in the procedure to synthesize aqueous colloidal $MoO_3$.

FIG. 1e is a schematic showing the decreasing particle size in the procedure to synthesize aqueous colloidal $MoO_3$.

FIG. 1f is a schematic of the final particle size in the procedure to synthesize aqueous colloidal $MoO_3$.

FIG. 2a is a graph of the XRD pattern of the as-prepared whole product with micro-rod structure.

FIG. 2b is low resolution TEM image of $MoO_3$ suspension.

FIG. 2c is a high resolution TEM image of $MoO_3$ suspension.

FIG. 2d is a high resolution BF-STEM image of a single $MoO_3$ nanocrystal.

FIG. 2e is a DF-STEM image of $MoO_3$ suspension.
FIG. 2f is a BF-STEM image of $MoO_3$ suspension.
FIG. 2g is a BF-STEM image of Mo.
FIG. 2h is a BF-STEM image of O.
FIG. 2i is a BF-STEM image of Mo and O overlapped.

FIG. 10a is an SEM image of a drop-casted MTWO film.
FIG. 10b is zoomed in SEM images of drop-casted MTWO films.
FIG. 10c is a schematic illustration of the MTWO nanowire spray-coating process
FIG. 10d is a schematic illustration of the formation of uniform MTWO cathode.
FIG. 10e is an SEM image of the spray-coated MTWO cathode.

DETAILED DESCRIPTION OF PREFERRED EMBODIMENTS

Figure 6A:
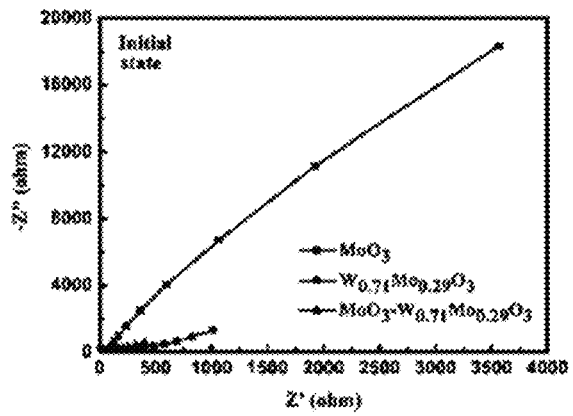
FIG. 6a is a Nyquist plot of $MoO_3$, $W_{0.71}Mo_{0.29}O_3$, and $MoO_3$—$W_{0.71}Mo_{0.29}O_3$ in the pristine state.
Figure 6B:
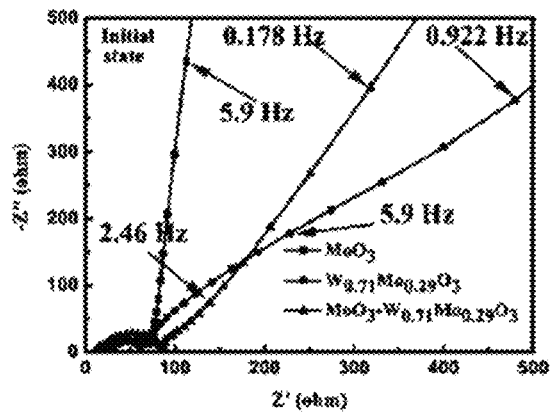
FIG. 6b is a Nyquist plot of $MoO_3$, $W_{0.71}Mo_{0.29}O_3$, and $MoO_3$—$W_{0.71}Mo_{0.29}O_3$ in the pristine state.
Figure 6C:
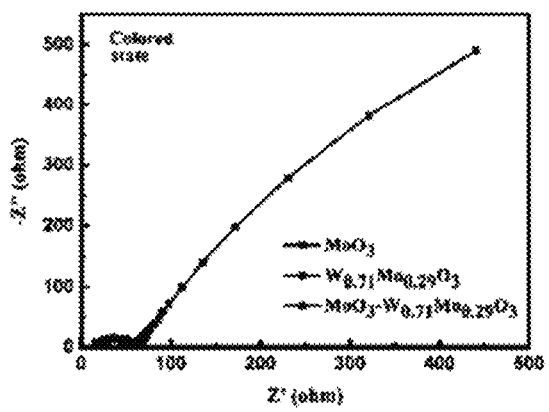
FIG. 6c is a Nyquist plot of $MoO_3$, $W_{0.71}Mo_{0.29}O_3$, and $MoO_3$—$W_{0.71}Mo_{0.29}O_3$ in the coloured state.
Figure 6D:
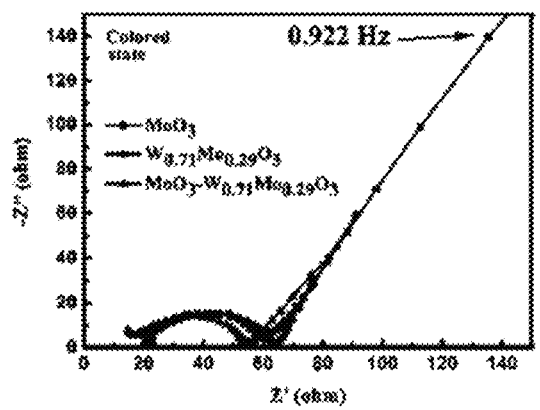
FIG. 6d is a Nyquist plot of $MoO_3$, $W_{0.71}Mo_{0.29}O_3$, and $MoO_3$—$W_{0.71}Mo_{0.29}O_3$ in the coloured state.
Figure 6E:
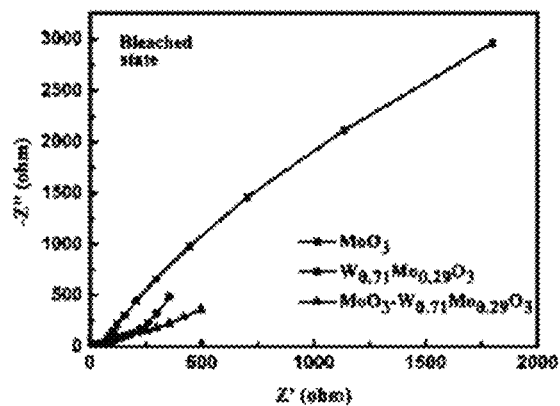
FIG. 6e is a Nyquist plot of $MoO_3$, $W_{0.71}Mo_{0.29}O_3$, and $MoO_3$—$W_{0.71}Mo_{0.29}O_3$ in the bleached state.
Figure 6F:
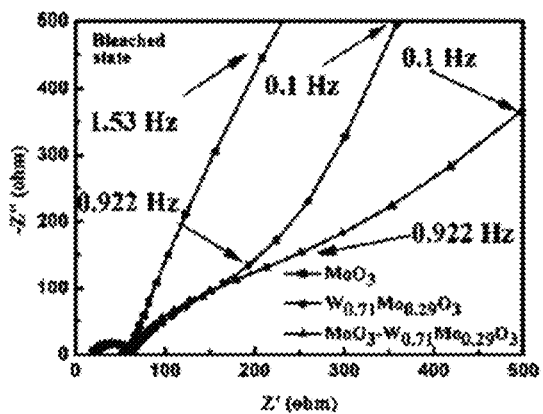
FIG. 6f is a Nyquist plot of $MoO_3$, $W_{0.71}Mo_{0.29}O_3$, and $MoO_3$—$W_{0.71}Mo_{0.29}O_3$ in the bleached state.
Figure 7A:
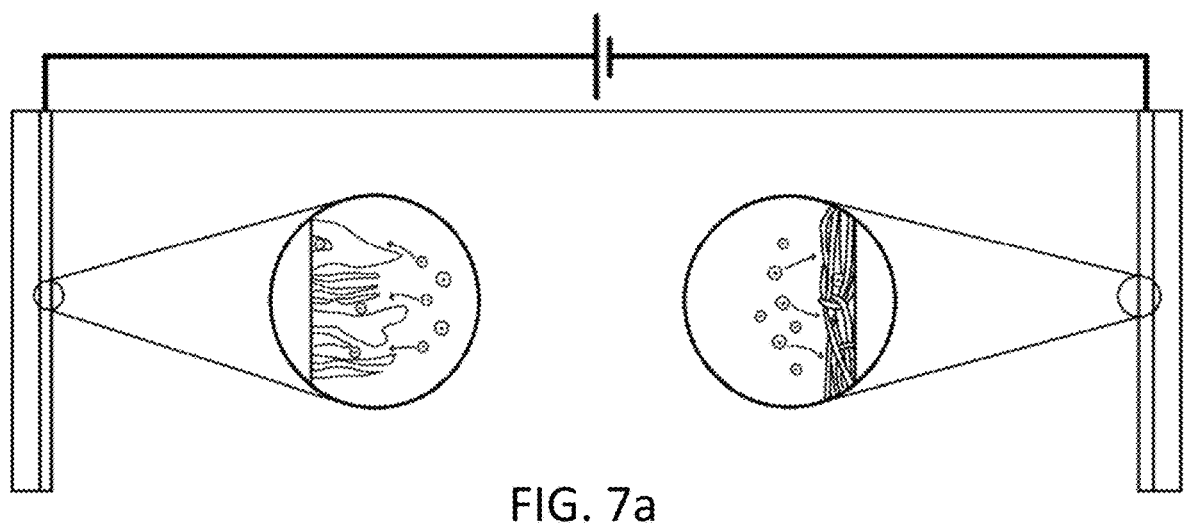
FIG. 7a is a schematic illustration of a complementary electrochromic battery.
Figure 7B:
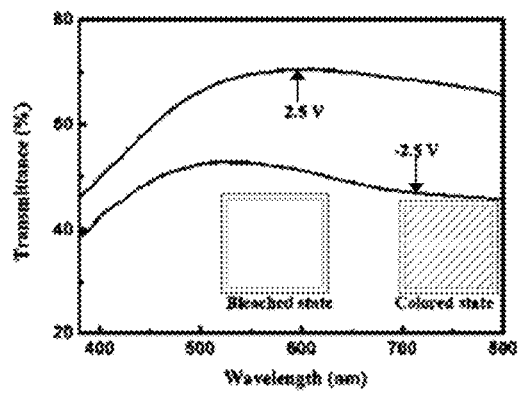
FIG. 7b is visible-near infrared transmittance spectra for the single active layer battery.

An electrochromic (EC) device, generally identified by reference numeral 10, will now be described with reference to FIG. 1 through 16. Referring to FIG. 14, EC device 10 has a first electrode 12, a second electrode 14 and an electrolyte 16 between first electrode 12 and second electrode 16. First electrode 12 and second electrode 14 may be carried by a first substrate 18 and a second substrate 20 respectively. First electrode 12 is preferably a multi-layer thin film with a first conductive thin film 22 adjacent to first substrate 18, and a first electrochromic layer 24 between first conductive thin film 22 and electrolyte 16. First conductive thin film 22 may be a thin film of metal, conductive transparent oxide, or other type of conductive material. Second electrodes 14 may be a second conductive thin film 26 deposited onto second substrate 20, as shown in FIG. 7a and FIG. 14, or a piece of conductive material 28 such as metal placed into electrolyte 16 that is separated from first electrode 12 by electrolyte 16, as show in FIG. 12a and FIG. 15. Second electrode 14 may have a second EC layer 25 between second conductive thin film 26 and electrolyte 16. It will be understood that first electrode 12 may be either the anode or cathode of EC device 10, with the second electrode being the corresponding counter electrode. Electrolyte 16 may be a liquid, or it may be any other type of material capable of containing ions such as a solid, or a mixture of solid and liquid. Electrolyte 16 may contain anions and cations, and there may be a plurality of anionic or cationic species within electrolyte 16. EC device 10 may be used in windows, mirrors, displays, or any other application where reversibly changing transparency and storing charge may be required.

EC device 10 has a high transparency state and a low transparency state. EC device 10 may be capable of switching between high and low optical states upon occurrence of a predetermined condition. In general, it will be difficult to achieve a fully transparent device 10, as there will typically be some optical loss in the electrodes 12 and 14 and electrolyte 16. As such, the high transparency state is understood to refer to a state that is more transparent that the low transparency state. For example, EC device 10 may be defined as having an optical contrast that is the difference in percentage of visible light that passes through the EC device in the high transparency state and the percentage of visible light that passes through the EC device in the low transparency state. In one example, EC device may have an optical contrast that is greater than or equal to 40%.

EC device 10 has a charged state and a discharged state. EC device 10 is in the charged state when there is a potential difference between first electrode 12 and second electrode 14, and transitions to the discharged state by discharging a DC current. It will be understood that charge may be stored at first or second EC layers 24, 25 as ions that are present in electrolyte 16, or as part of a redox reaction at either of the first or second electrodes 12 and 14. Depending on the design of EC device 10, either the charged state or the discharged state may correspond with the high transparency state, with the other of the charged or discharged state corresponding with the low transparency state.

First electrochromic layer 24 is a compound 30 with the chemical formula $A_iB_jO_k$, where i and j are greater than 0, and k a stoichiometric value that balances the equation. A is an element that is selected to improve the optical contrast of EC device, and is preferably W, Mn, Mo, Co, Ni, Cs, or Zn, or combinations thereof. If A is a plurality of elements, then it may be defined as $A=A_1i_1A_2i_2 \ldots A_{n-1}i_{n-1}A_ni_n$ where $i=\Sigma_1^n i_n$. B is an element that is selected to improve a specific charge capacity of EC device 10, and is preferably Mo, Ti, Nb, or V, or combinations thereof. If B is a plurality of elements, then it may be defined as $B=B_1j_1B_2j_2 \ldots B_{n-1}j_{n-1}B_nj_n$ where $j=\Sigma_1^n j_n$.

As noted above, A is chosen so that compound 30 has an improved optical contrast when compared to a material $BO_k$ and B is chosen so that compound 30 has an improved specific charge capacity when compared to a material $AO_k$. Generally, A will be different than B.

EC layer 24 may be a uniform thin film of compound or it may be a film made from a matrix of nanostructured particles. The film nay have at least one dimension that is less than 1 μm thick. The nanostructured particles may be, but are not limited to, nanoparticles, nanowires, nanofibers, nanorods, nanosheets or nanoplatelets.

First EC layer 24 may additionally contain an additive compound 32 that is mixed with compound 30 such that the molecular structures of both compound 30 and additive compound 32 are not altered after mixing. Additive compound 32 may be added to alter properties of EC device 10 such as the optical contrast, specific charge capacity, conductivity, charge carrier transport, adhesion between adjacent layers, optical state switching time, discharge voltage, or other properties.

Examples of additive compound 32 include organic compounds and oxides with the formula $C_lO_m$ such that EC layer 24 has a chemical formula $C_lO_m-A_iB_jO_k$. C is preferably W, Mn, Mo, Co, Ni, Cs, Zn, Ti, Nb, and V, or combinations thereof. l has a value of greater than 0, and m is a stoichiometric value that balances the formula. If C is a plurality of elements, then it may be defined as $C=C_1l_1C_2l_2 \ldots C_{n-1}l_{n-1}C_nl_n$ and $l=\Sigma_1^n l_n$. In EC layer 24, compound 30 and additive compound 32 may both be made from nanostructured particles and mixed together. EC layer 24 may have a plurality of additive compounds.

Figure 15:
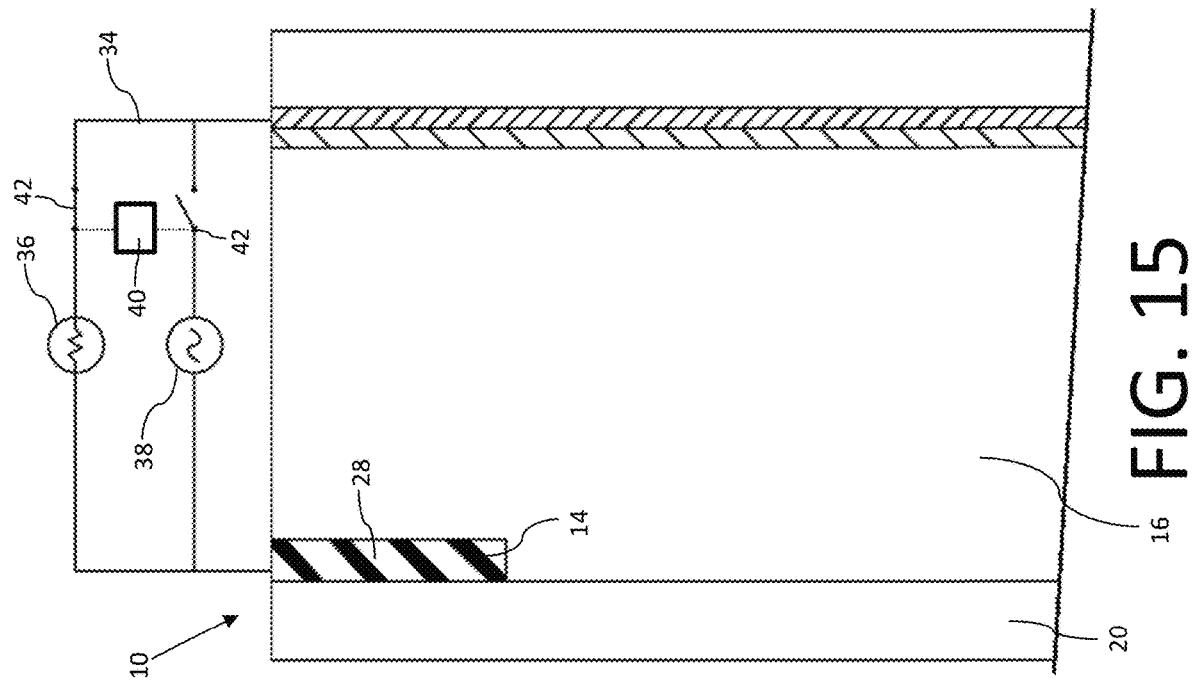
FIG. 15 is a schematic diagram of an EC device with an EC layer at one electrode.

During normal operation, the optical state of EC device may be reversibly switched between high transparency and low transparency upon occurrence of a predetermined condition, such as a timer, level of ambient light or completion of an electrical circuit 34. Switching the optical state may correspond with a transition from a charged state to a discharged state and a current flow through electrical circuit 34 that is capable of providing electrical energy to an electrical device 36 such as a light emitting diode. Switching the optical state may also correspond with a transition from the discharged state to the charged state and a current flow through electrical circuit 34 that requires an input of energy from an energy providing electrical device 38, such as a voltage or current source. Switching the optical state may also correspond with a transition from the discharged state to the charged state without a connection between first electrode 12 and second electrode 14, where the charge is acquired through thermal activation and diffusion of ions and electrons out of first EC layer 24 through electrolyte 16. A controller 40 may be provided as part of electrical circuit 34 to control the optical state and charge state of EC device 10 in response to a predetermined condition. As shown in FIG. 14 and FIG. 15, controller 40 may be connected to switches 42 in electrical circuit 34 to control which of the energy providing electrical device 38 or electrical device is connected between the first electrode 12 and second electrode 14.

In one example, EC device may be fabricated according to the following steps:

suspending particles of compound 30 in liquid to create a suspension 31;

coating a conductive substrate with suspension 31;

allowing the liquid to evaporate to form EC layer 24 and first anode 12;

placing second electrode 14 opposite to EC layer 24 and filling the space in between first electrode 12 and second electrode 14 with electrolyte 16.

Coating the conductive substrate may be accomplished by, but is not limited to, drop-casting, spray-coating, or dip coating. Coating conductive substrate may include a plurality of individual coats that are layered on top of conductive thin film 22. Suspension 31 may also include particles of additive compound 32 or additive compounds 32 may be placed in a suspension and coated separately to compound 30. Coating the conductive substrate may include a plurality of individual coats of suspension 31 and a suspension with additive compound 32 that may or may not be alternated between. One or both of compound 30 and additive compound 32 may be nanostructured particles. Each of the fabrication steps may occur at a temperature equal to or less than ##. EC layer 24 may be annealed as part of the fabrication process. Suspension 31 may be formed through the reaction of one or more precursor chemicals 35, as shown in FIG. 1a FIG. 1f. Nanostructured compound 30 may be made by sonicating a suspension of larger particles.

Two examples of suitable embodiments will now be described.

Example 1

The first example uses a simple synthesis methodology to address the electrochromic shortcomings of $MoO_3$ electrodes by creating a hybrid of aqueous nanocrystalline colloidal $MoO_3$ and colloidal $W_{0.71}Mo_{0.29}O_3$ nanowires. A facile scalable top-down method may be used for synthesizing colloidal $MoO_3$ with nanocrystals less than 10 nm in size. The highly dispersed colloidal $MoO_3$ is used to prepare, via a normal solution process, $MoO_3$ nanocrystals embedded in the nanopores of $W_{0.71}Mo_{0.29}O_3$ nanowire film to form a $MoO_3$—$W_{0.71}Mo_{0.29}O_3$ nanocomposite film. In the nanocomposite film, $W_{0.71}Mo_{0.29}O_3$ nanowires may serve as a buffer matrix eliminating large-volume expansion of $MoO_3$ during the lithiation and delithiation process, and may also provide numerous electron transport pathways to enhance transport kinetics. The $MoO_3$—$W_{0.71}Mo_{0.29}O_3$ nanocomposite film constitutes a new class of electrochromic energy storing performance. In comparison to the $W_{0.71}Mo_{0.29}O_3$ film, the $MoO_3$—$W_{0.71}Mo_{0.29}O_3$ nanocomposite film may have 100% enhanced specific energy capacity, and 22% improved optical modulation over a broad spectrum. Moreover, a complementary energy storing smart (ESS) window (8×8 $cm^2$), also referred to as EC device 10, constructed by spray-coated $MoO_3$—$W_{0.71}Mo_{0.29}O_3$ and NiO electrodes may exhibit faster electrochemical kinetics than the single-active-layer ESS window. The complementary ESS may also have 100% improved optical contrast over a broad spectrum, high switching speed, and high energy storage capacity. The energy stored in the complementary ESS window, when coloured and in charged state 54 after application of 2.5 V for 1 min, may be capable of powering an LED or other electrical device 36 for more than 10 min, thus demonstrating its potential to function as an electrochromic window while concurrently powering electronic devices. These novel synthesis and processing approaches may offer a unique methodology to produce $MoO_3$-based electrochromic batteries, highlighted by the high-yield production of aqueous colloidal $MoO_3$ and its synergistic inclusion in $W_{0.71}Mo_{0.29}O_3$ nanowire electrode component design for enhancing electrochemical energy conversion and storage, smart windows, and digital display applications.

Methods

Synthesis of $MoO_3$ Colloid

The colloidal $MoO_3$ nanocrystals may be synthesized according to the following procedure which is illustrated in FIG. 1a to FIG. 1f: Mo powder (0.36 g) was added to 75 mL of $HNO_3$ solution (0.5M, FIG. 1a) and refluxed at 75° C. under stirring to form a white suspension (FIG. 1b), which was then collected by centrifugation and thoroughly washed with deionized (DI) water. The resulting white product was then redispersed in DI water to form a precursor solution (1.5 mg/mL). Afterward, the precursor solution was sonicated in an ultrasonic cleaning bath, finally producing a clear solution.

Although the resulting colloidal $MoO_3$ suspension is transparent to the naked eye, a strong Tyndall effect can be observed in the suspension shown in FIG. 1c. To reveal more details on the formation of aqueous clear colloidal $MoO_3$ from the white suspension, the reaction is interrupted at various intervals during the sonication stage, and the suspensions are drop-casted onto silicon wafers for morphology evolution characterization. As schematically illustrated in FIGS. 1d and 1e, during sonication, the micro-rods fragment into smaller nanostructure. The size of the micro-rods decreases with increased sonication time until clear colloidal $MoO_3$ nanocrystals form, as shown in FIG. 1f.

Synthesis of $W_{0.71}Mo_{0.29}O_3$ Colloid

The $W_{0.71}Mo_{0.29}O_3$ nanowire ink may be prepared according to the following procedure: $H_2WO_4$ (5 g) and $MoO_3$ (1.44 g) were dissolved in 60 mL $H_2O_2$ (30 wt %) under stirring and heating at 95° C., then the solution was diluted to form the precursor with DI water (70 mL) and EG (70 mL). Afterward, the precursor (100 mL) and DI water (100 mL) were added into a 250 mL flask and refluxed at 105° C. for 20 h. After performing the reaction, the products were collected by centrifugation and thoroughly washed with ethanol and DI water. The product was then redispersed in DI water to form a pale blue ink (1.5 mg/mL).

Solution Process Fabrication of Electrodes

First conductive thin film 22 may be coated with first EC layer 24 according to the following procedure to create first electrode 12: a fluoride-doped tin oxide (FTO), also referred to as first conductive thin film 22, coated glass substrate is first immersed into 1 wt % polyethylenimine (PEI) solution and DI water respectively; them the substrate was blow-dried using $N_2$ gas. Next, 0.5 mL of $MoO_3$ colloid, $W_{0.71}Mo_{0.29}O_3$ colloid and a mixture of the two colloids were drop casted onto FTO class covering an 8×35 $mm^2$ area. The concentrations of the colloids used for drop-casting were all 1.5 mg/mL. The mixture of the $MoO_3$ and $W_{0.71}Mo_{0.29}O_3$ was obtained by mixing equal volumes of the solutions. To form the $MoO_3$—$W_{0.71}Mo_{0.29}O_3$ electrode a 25 mL 1.5 mg/mL colloidal mixture of $MoO_3$ and $W_{0.71}Mo_{0.29}O_3$ was deposited onto pre-cleaned ITO glass substrates (10×8.7 $cm^2$) with hot plate heating. The substrate temperature during the deposition was approximately 260° C. The spray-coated NiO electrode was prepared by depositing 8 mL of 0.1 M $Ni(NO_3)_2.6H_2O$ solution onto FTO glass substrates (10×8.7 $cm^2$) with hot plate heating. The substrate temperature during the spraying was approximately 360° C. All the spray-coated samples were post-annealed in air at corresponding temperatures for 24 hours.

Energy Storage Smart Window Assembly

The ESS window may be assembled according to the following procedure: the single-active-layer ESS window was assembled using FTO glass as the counter electrode, the spray coated $MoO_3$—$W_{0.71}Mo_{0.29}O_3$ as the work electrode and 1 M $LiClO_4$ in propylene carbonate (PC) as the electrolyte. The complementary ESS window was assembled using the spray-coated NiO electrode as second electrode 12, spray coated $MoO_3$—$W_{0.71}Mo_{0.29}O_3$ electrode as first electrode 14, and 1 M $LiClO_4$ in PC as electrolyte 16.

Results

To gain insight into the $MoO_3$ micro-rod structure, the phase composition of the white colloidal suspension is first characterized by powder X-ray diffraction (XRD) measurements. As shown in FIG. 2a, diffraction peaks marked with an open-head arrow in the XRD pattern can be indexed to $MoO_3.0.5H_2O$ (JCPDS card no. 49-0652), and those marked with a closed-head arrow can be assigned to $MoO_3.H_2O$ (JCPDS card no. 26-1449). With no other crystalline phases being detected, this finding is interpreted as pointing to the molybdenum metal powder having completed the reaction during the reflux reaction. The transmission electron microscope (TEM) image of the $MoO_3$ suspension after several hours of sonication, reveals that the $MoO_3$ colloid forms a flat film when dropped onto the TEM grid, as shown in FIG. 2b. This is attributed to the high surface energy of the nanoparticles in the colloid. Shown in FIG. 2c, the high-resolution TEM images affirm that the flat film is composed of anisotropic $MoO_3$ nanocrystals, most of which are less than 10 nm in diameter. A high-resolution bright-field scanning transmission electron microscopy (BF-STEM) image of a single 7 nm $MoO_3$ nanocrystal (FIG. 2d) shows that the clear lattice fringe of 1.29 Å corresponds well with diffraction from (2-31) planes of triclinic $MoO_3.H_2O$. The dark-field scanning transmission electron microscope (DF-STEM) image, shown in FIG. 2e, confirms that the flat film is composed of nanocrystals, while the elemental mapping images shown in FIG. 2f indicate that the flat film is composed of molybdenum oxide, where the Mo and O spatial distributions are shown in FIG. 2g and FIG. 2h, respectively and FIG. 2i shows the Mo and O spatial distributions overlapping.

Figure 3A:
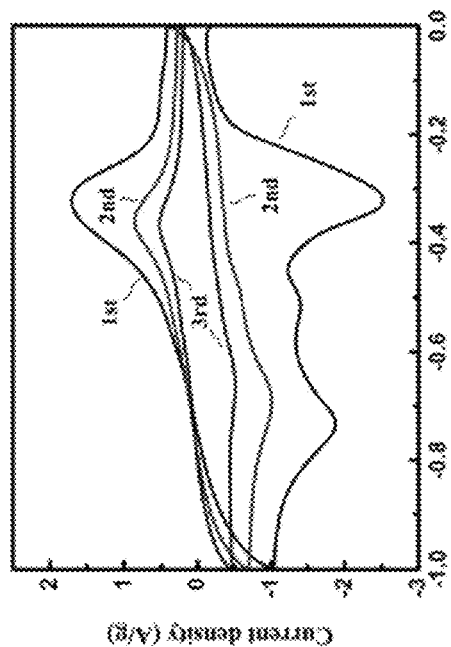
FIG. 3a is an FESEM image of drop-casted $MoO_3$ film.
Figure 3B:
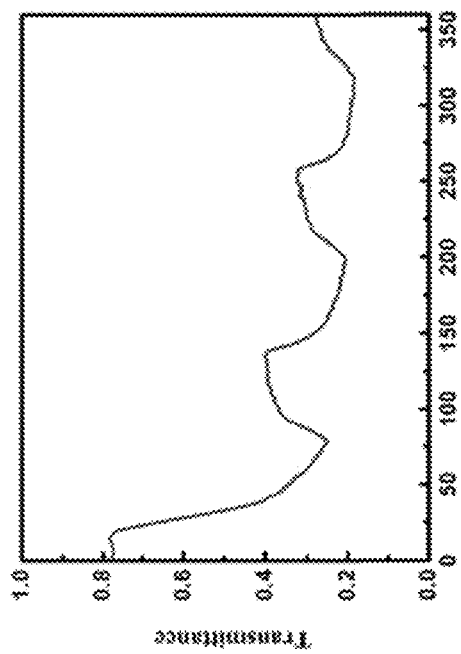
FIG. 3b is CV curves of the drop-casted $MoO_3$ film.
Figure 3C:
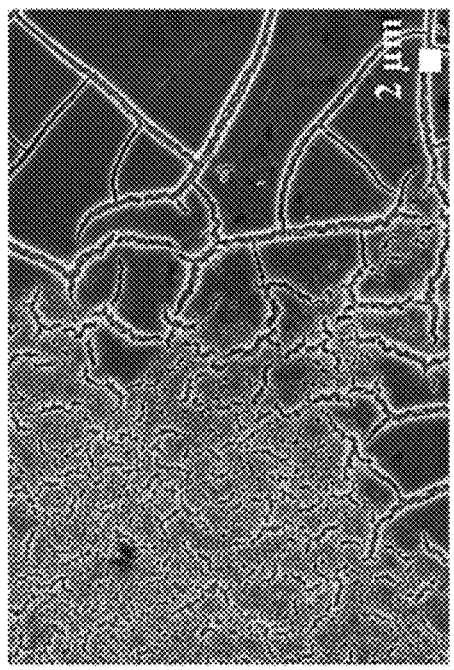
FIG. 3c is the charge/discharge profiles of the drop-casted $MoO_3$ film.
Figure 3D:
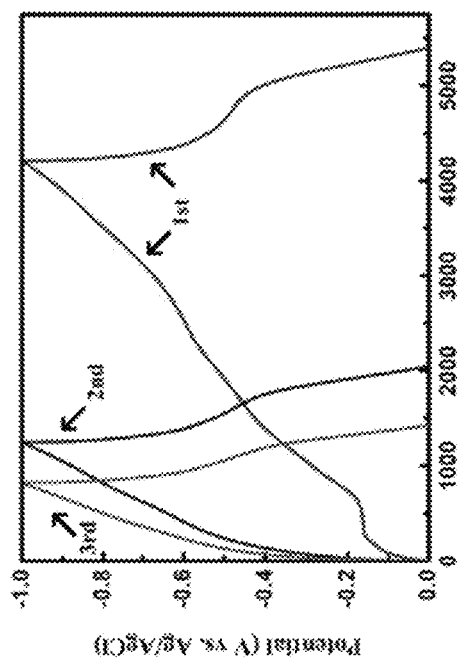
FIG. 3d is the in situ transmittance for the drop-casted $MoO_3$ film.

The $Li^+$ ion conversion reaction of the top-down fabricated aqueous colloidal $MoO_3$ is evaluated as an electrode material for an electrochromic battery platform. In order to obtain accurate mass loading of active materials on the fluorine-doped tin oxide (FTO) glass, the drop-casting technique may be used for the preparation of electrodes. FIG. 3a depicts a typical FESEM image of the drop-casted $MoO_3$ film. There are sub-micrometer size cracks on the drop-casted film due to the post-heating treatment. The initial three cyclic voltammetry (CV) curves of the drop-casted $MoO_3$ film are presented in FIG. 3b. In the first cathodic scan, three reduction peaks can be observed at −0.73 V, −0.51 V, and −0.32 V. The peak, centered at −0.32 V, is only observed in the first cathodic scan, and is attributed to the formation of a solid electrolyte interphase (SEI) layer, whereas the peaks at −0.73 V and −0.51 V are attributed to the intricate multistep $Li^+$ intercalation processes. After the first cycle, the current densities of all the peaks are reduced, signalling significant capacity fading during the first three cycles. Furthermore, the peak at −0.51 V is barely discernible in the second cathodic scan, and completely disappears in the third cathodic scan, indicating the deformation of the $MoO_3$ crystalline structure during the charge/discharge process. As shown in FIG. 3c, the galvanostatic discharge/charge curves of the drop-casted $MoO_3$ film for the initial three cycles at 0.1 A/g correspond well to the CV profiles. The first charge curve displays voltage plateaus at −0.17 V, −0.4 V, and −0.6 V, while the first discharge curve shows only one voltage plateau at 0.5 V. These peaks are consistent with the four redox peaks in the first CV scan. The charge storage capabilities were observed as battery capacity due to the battery-like behavior of the electrodes. The initial charge capacity of the drop-casted $MoO_3$ film is 121.3 mA h/g, pointing to a capacity loss of approximately 87 mA h/g with a Columbic efficiency (CE) of 28%. The CE then increases to 44.3% in the third cycle; this is accompanied by a loss of 49.8% in discharge capacity. The capacity loss is attributed to the irreversible intercalation of the Li+ ions into the $MoO_3$ crystal lattice, as well as other irreversible processes, such as the inevitable formation of an SEI layer and electrolyte decomposition. Consequently, as depicted in FIG. 3d, the irreversible intercalated $Li^+$ ions during the initial three cycles induce degradation of optical modulation and reversibility on extended $Li^+$ ion exchange. Thus, the irreversible switching of $MoO_3$ films hinders their practical deployment in energy storing smart windows, even though the $MoO_3$ has a superior theoretical specific capacity.

Figure 4A:
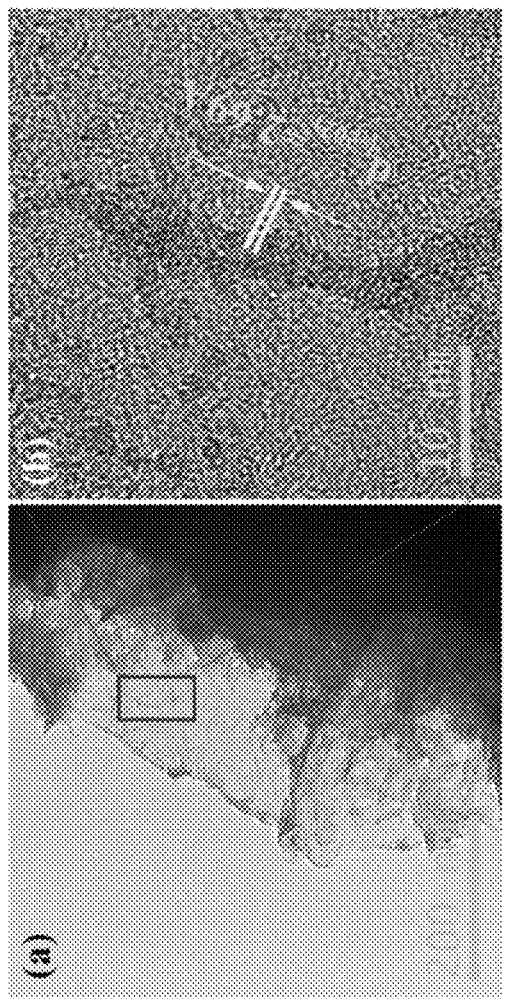
FIG. 4a is a low resolution TEM image of the $MoO_3$ and $W_{0.71}Mo_{0.29}O_3$ colloidal composite.
Figure 4B:
FIG. 4b is a high resolution TEM image of the $MoO_3$ and $W_{0.71}Mo_{0.29}O_3$ colloidal composite.
Figure 4C:
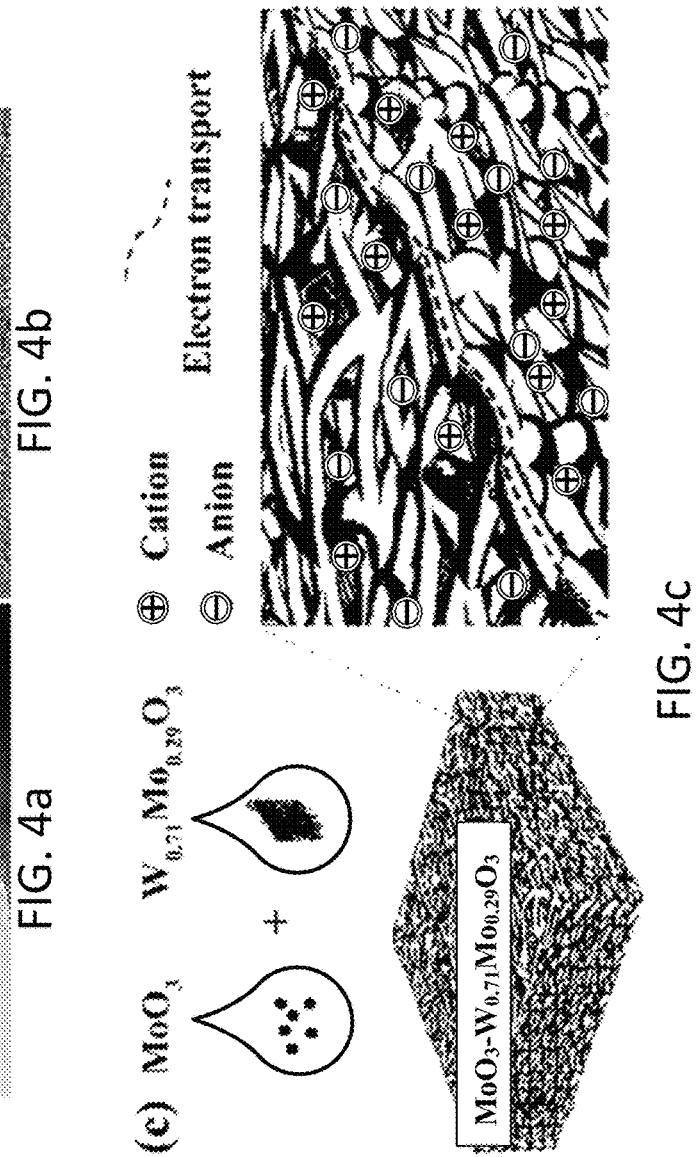
FIG. 4c is a schematic illustration of the matrix effect of the $W_{0.71}Mo_{0.29}O_3$ nanowires.

Notwithstanding, fully reversible switching of $MoO_3$ may be realized by hybridizing $MoO_3$ with one-dimensional $W_{0.71}Mo_{0.29}O_3$ due to its synergistically improved electrochemical properties and its role as an excellent buffer matrix for the $MoO_3$ electrode. The introduction of $W_{0.71}Mo_{0.29}O_3$ in $MoO_3$ is a promising prospect with regard to utilizing $MoO_3$ as an electrochromic energy storing material, because the high content of Mo in the hybrid film may provide superior capacity while also leading to a larger optical modulation. To test this hypothesis, $MoO_3$—$W_{0.71}Mo_{0.29}O_3$ hybrid films are assembled with the aqueous mixture of $MoO_3$ and $W_{0.71}Mo_{0.29}O_3$ colloids. The TEM images of the aqueous mixture of $MoO_3$ and $W_{0.71}Mo_{0.29}O_3$ colloids presented in FIG. 4a and FIG. 4b show that the colloid mixture forms a flat film composed of uniformly dispersed $W_{0.71}Mo_{0.29}O_3$ nanowires infiltrated with $MoO_3$ nanocrystals. Due to the matrix effect of the $W_{0.71}Mo_{0.29}O_3$ nanowires, the colloid mixture forms a template-free porous structure, which is beneficial for the electrochemical kinetic as illustrated in FIG. 4c. Specifically, the nanoporous structure provides more ion-buffering reservoirs and increases the quantity of the active sites, thereby enhancing the electrochemical kinetics. The nanowire structure also provides numerous electron transport pathways for reducing the electron transport barrier within the electrode, as shown by the dotted line in FIG. 4c.

Figure 5A:
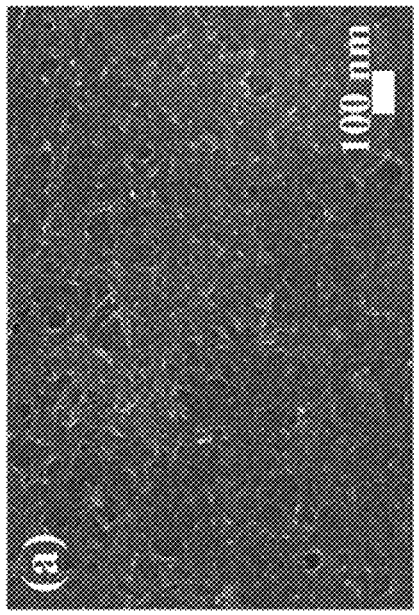
FIG. 5a is an FESEM image of the drop-casted $MoO_3$—$W_{0.71}Mo_{0.29}O_3$ film.
Figure 5C:
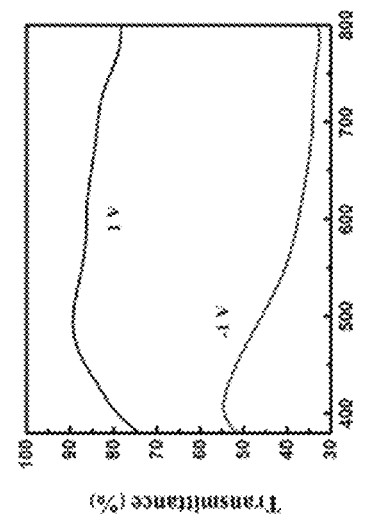
FIG. 5c is visible-near infrared transmittance spectra of the drop-casted $MoO_3$—$W_{0.71}Mo_{0.29}O_3$ film.
Figure 5E:
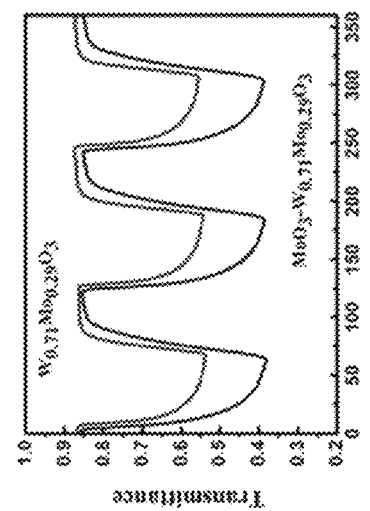
FIG. 5e is in situ transmittance spectra of the drop-casted $MoO_3$—$W_{0.71}Mo_{0.29}O_3$ film and $W_{0.71}Mo_{0.29}O_3$ film.
Figure 5B:
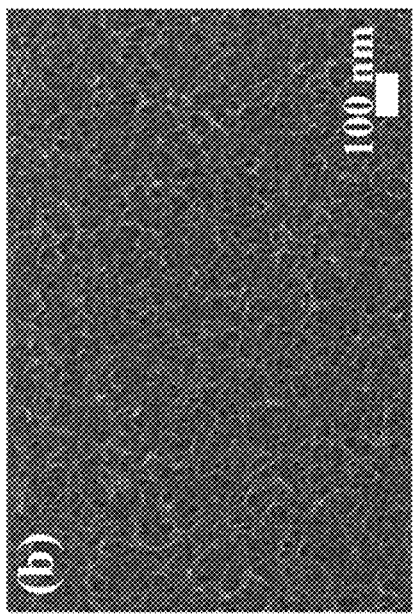
FIG. 5b is an FESEM image of the drop-casted $W_{0.71}Mo_{0.29}O_3$ film.

The FESEM images of the drop-casted $MoO_3$—$W_{0.71}Mo_{0.29}O_3$ hybrid composite film and $W_{0.71}Mo_{0.29}O_3$ film, shown in FIG. 5a and FIG. 5b, respectively, confirm the matrix effect of $W_{0.71}Mo_{0.29}O_3$ nanowires. The sponge-like $W_{0.71}Mo_{0.29}O_3$ film comprises nanowire interconnects that form a networked porous structure. It is apparent that the morphology of the $W_{0.71}Mo_{0.29}O_3$ film may be altered with the inclusion of $MoO_3$ nanocrystals. Specifically, $MoO_3$ nanocrystals impregnate the nanopores in the nanowire matrixes, thus forming a uniform $MoO_3$—$W_{0.71}Mo_{0.29}O_3$ hybrid film.

Figure 5D:
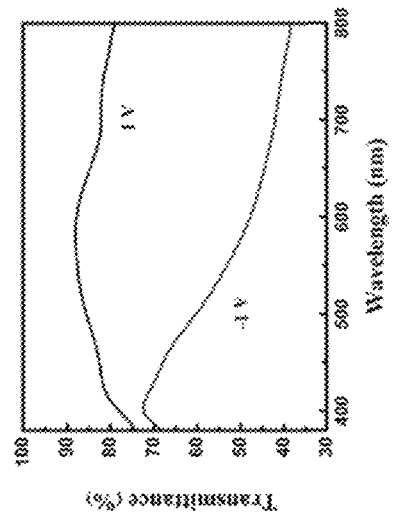
FIG. 5d is visible-near infrared transmittance spectra of the drop-casted $W_{0.71}Mo_{0.29}O_3$ film.
Figure 5F:
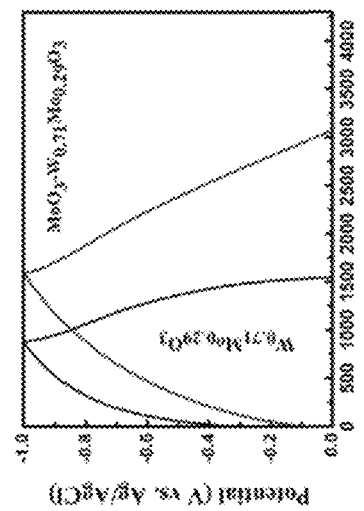
FIG. 5f is the second charge-discharge curves of the $W_{0.71}Mo_{0.29}O_3$ film and the $MoO_3$—$W_{0.71}Mo_{0.29}O_3$ film.

The hybrid film exhibits superior performance, achieving fully reversible switching in $MoO_3$-based electrodes. The absence of irreversible peaks in the CV curve of the hybrid film can be shown, indicating the elimination of irreversible side reactions (i.e., the formation of SEI layer). FIG. 5c and FIG. 5d display the visible-near infrared transmittance spectrum of the $MoO_3$—$W_{0.71}Mo_{0.29}O_3$ hybrid film shown in FIGS. 5a and $W_{0.71}Mo_{0.29}O_3$ film shown in FIG. 5b measured at −1V and +1V in 1M $LiClO_4$ in propylene carbonate. This opens a significantly wider contrast window within the 380-800 nm wavelength spectral range. The optical contrast of the $MoO_3$—$W_{0.71}Mo_{0.29}O_3$ hybrid film at 632.8 nm after applying voltages of ±1.0 V is measured to be 49.6%, which is higher than that of the $W_{0.71}Mo_{0.29}O_3$ film or $MoO_3$ individually. Notably, the contrast of the $MoO_3$—$W_{0.71}Mo_{0.29}O_3$ hybrid film can still reach 46.7% at a wavelength of 550 nm (34.5% for the $W_{0.71}Mo_{0.29}O_3$ film). This is attributable to the strong light absorption of $MoO_3$ in its coloured state. The dynamic transmittances of the films are presented in FIG. 5e, exhibiting a uniform contrast trend observed at constant potentials and high cycle-to-cycle reversibility. The $MoO_3$—$W_{0.71}Mo_{0.29}O_3$ hybrid film can achieve a fully bleached state during the dynamic cycling, which leads to the inference that the intercalated lithium ions can be extracted from the $MoO_3$—$W_{0.71}Mo_{0.29}O_3$ hybrid film without the large capacity loss typical of pure $MoO_3$ films. FIG. 5f displays the second charge-discharge curves of the $W_{0.71}Mo_{0.29}O_3$ and $MoO_3$—$W_{0.71}Mo_{0.29}O_3$ hybrid films. Due to the high content of Mo in the hybrid film, the specific capacity of 41.9 mAh/g in the $MoO_3$—$W_{0.71}Mo_{0.29}O_3$ hybrid film may be almost twice the capacity of the $W_{0.71}Mo_{0.29}O_3$ film (23.1 mAh/g). The specific capacity of the $MoO_3$—$W_{0.71}Mo_{0.29}O_3$ hybrid film is also comparable to that of the $WO_3$ quantum dot electrode (i.e., 42 mA h/g) tested in aqueous $H_2SO_4$ electrolyte. The use of organic electrolyte ensures that the as-prepared porous electrodes can operate in a wide potential operating window of 1.0 V, which is wider than for previously reported $WO_3$ electrodes. The wider operating voltage may be an efficient solution to improve the energy density of energy storing devices. Although the drop-casting technique is considered to have a detrimental effect on the CE because the drop-casted films are more prone to cracking, the $MoO_3$—$W_{0.71}Mo_{0.29}O_3$ hybrid film is still able to achieve a CE of 66%, while that of the $W_{0.71}Mo_{0.29}O_3$ film is only 48%. It is worth noting that the specific capacity of the $MoO_3$—$W_{0.71}Mo_{0.29}O_3$ hybrid film during the second cycle is higher than during the initial cycle, an observation which can be attributed to the improved $Li^+$ diffusion kinetics following activation of the hybrid film.

Colouration efficiency, is an important parameter for comparing the EC performance of the materials. The slightly higher η of the $MoO_3$—$W_{0.71}Mo_{0.29}O_3$ hybrid film suggests that the greater amount of energy stored in the hybrid film induces a greater degree of colour change, leading to the inference that the $MoO_3$ in the hybrid film can enhance not only the capacity, but also the electrochromic effect. This high colouration efficiency reveals that the $MoO_3$—$W_{0.71}Mo_{0.29}O_3$ hybrid electrode may be a viable candidate to resolve the incompatibility between colouration efficiency and charge density for electrochromic energy storing devices.

To better understand the electrochemical performance of the $MoO_3$—$W_{0.71}Mo_{0.29}O_3$ hybrid film electrode, electrochemical impedance spectroscopy (EIS) is performed at various colour states. As shown in FIG. 6a FIG. 6f, the similar equivalent series resistance (ESR) values of all the electrodes at different colour states is a result of the similar ohmic resistance of the electrolyte and cell components. The $MoO_3$ electrode shows a much longer Warburg region than that of $W_{0.71}Mo_{0.29}O_3$ and $MoO_3$—$W_{0.71}Mo_{0.29}O_3$ electrodes, indicating a poor solid state diffusion of the Li+ ions. This explains the poor reversibility of the pure $MoO_3$ electrodes. Notably, the Nyquist plots of these electrodes show different curves under different states. In addition to a high frequency semicircle (HFS) and an inclined line in the low-frequency (LF) region, a small middle-to-low frequency semicircle (MLFS) clearly exists under pristine and bleached states of the $W_{0.71}Mo_{0.29}O_3$ and $MoO_3$—$W_{0.71}Mo_{0.29}O_3$ electrodes. The HFS is related to the $Li^+$ ion migration through the surface of electrodes, while the MLFS is due to charge transfer interaction at the interface between electrode surface film and electrolyte. In the pristine state, the larger diameter HFS of the $MoO_3$—$W_{0.71}Mo_{0.29}O_3$ electrode can be attributed to the slightly denser structure of the film due to the infiltrated $MoO_3$ in the pores between nanowire interconnects. Furthermore, the smaller MLFS is indicative of the smaller charge transfer resistance of the $MoO_3$—$W_{0.71}Mo_{0.29}O_3$ electrode. At the coloured state, the $MoO_3$—$W_{0.71}Mo_{0.29}O_3$ electrode exhibits a tendency to reduce the diameter of the HFS, indicating the formation of the pathways for lithium ion migration and leading to improved $Li^+$ ion diffusion kinetics. This is consistent with the activation process of the hybrid film. The absence of MLFS reflects the significantly diminished charge transfer resistance when the electrodes are coloured, indicating the semiconductor-to-metal transition of the oxides. After bleaching, the $MoO_3$—$W_{0.71}Mo_{0.29}O_3$ electrode still shows an MLFS similar to the curve of the $W_{0.71}Mo_{0.29}O_3$ electrode, indicating the reversible metal-to-semiconductor transition of $MoO_3$—$W_{0.71}Mo_{0.29}O_3$ electrode. This, in turn, explains the fully reversible switching of the $MoO_3$—$W_{0.71}Mo_{0.29}O_3$ electrodes.

Figure 7C:
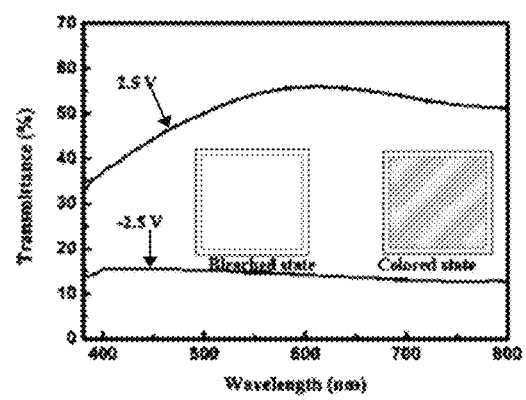
FIG. 7c is visible-near infrared transmittance spectra for the complementary electrochromic battery.
Figure 7D:
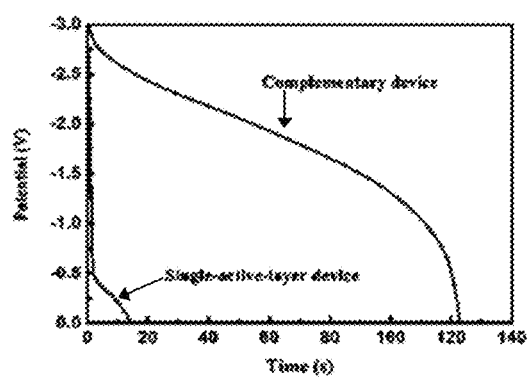
FIG. 7d is the discharge curves of the single-active-layer device and complementary device.
Figure 7E:
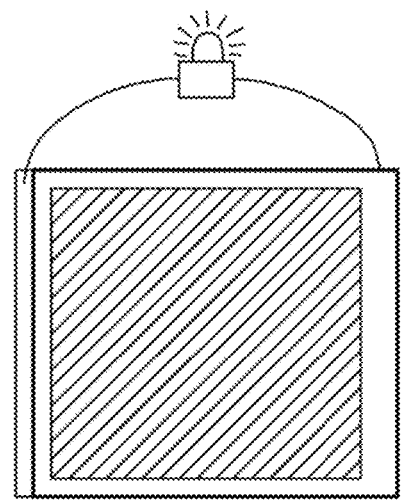
FIG. 7e is an illustration of the complementary electrochromic battery lighting an LED.

To demonstrate the performance of the high-capacity hybrid electrodes for practical use in ESS windows, prototype devices (8×8 $cm^2$) are assembled according to the method described above. In a complementary ESS window, a spray-coated $MoO_3$—$W_{0.71}Mo_{0.29}O_3$ electrode serves as the working electrode, while a spray-coated NiO electrode serves as a counter electrode to store the ions. As opposing redox reactions occur at the electrodes in an ESS window, when the $MoO_3$—$W_{0.71}Mo_{0.29}O_3$ film is being reduced (oxidized) an oxidation (reduction) reaction must simultaneously occur at the counter electrode. In a single-activelayer ESS window, the slow redox reactions at the counter electrode may hinder the electrochemical kinetics of the device, leading to a higher operating voltage for the device. It can be shown through CV curves, that the complementary ESS window shows a higher charge-insertion density over the same time period, pointing to its faster kinetics than the single-active-layer ESS window. Shown in FIG. 7b, the contrast of the single active-layer ESS window is measured to be 20% at 632.8 nm under ±2.5 V biases, while the complementary ESS window is two times higher than the single-active-layer ESS window (ca. 41.9%), as shown in FIG. 7c. In addition to operating as a counter electrode (ion storage layer) in the complementary ESS window, the NiO could also induce a higher contrast due to the associated anodic colouration effect. The response times of the complementary ESS window, it should be noted, may be faster than the single-active-layer ESS window. Moreover, the complementary ESS window also exhibits good energy storage performance. As can be seen in FIG. 7d, the considerably prolonged discharging time of the complementary ESS window indicates a higher specific capacity of 2.33 mAh/m² at a current density of 0.05 mA/cm, compared to the 0.06 mAh/m² of the single-active-layer ESS window. The lower areal capacity of the single-active-layer ESS window may be attributed to the absence of the NiO, which not only stores ions for improving the capacity of the device, but also accelerates the redox reactions, thus leading to reduced potentials for Li$^+$ ions insertion in the MoO$_3$—W$_{0.71}$Mo$_{0.29}$O$_3$ film. The areal capacity of 2.33 mA h/m² is comparable to previously reported inkjet-printed smart window (~1.4 mA h/m² at 0.3 mA cm$^{-2}$, 4.5×4.5 cm² of the device with 0.5M H$_2$SO$_4$ as the electrolyte). The good energy storage performance of the complementary ESS window enables the device to power an LED for more than 10 min after colouring under 2.5 V for 1 min, as shown in FIG. 7e, while the single-active-layer ESS window only causes the LED to flash. The duration of lighting an LED by the complementary ESS window is much longer than that by our previously reported W$_{0.71}$Mo$_{0.29}$O$_3$ ESS window, even though the W$_{0.71}$Mo$_{0.29}$O$_3$ ESS window is coloured at a much higher voltage (−5V). We thus demonstrate that the complementary ESS window is capable of not only switching colour quickly, but also of powering electronic devices after colouring for 10 min under a low voltage, a capability which should have a profound impact on the development of the ESS window.

The introduction of W$_{0.71}$Mo$_{0.29}$O$_3$ nanowire in MoO$_3$ not only addresses the reversibility issues of the MoO$_3$ electrodes, but may also enhances electrochemical behavior. The high dispersity of the MoO$_3$ and W$_{0.71}$Mo$_{0.29}$O$_3$ colloids enables a well-established facile and scalable spraying technique to fabricate electrodes. Additionally, an ESS window constructed using the spray-coated MoO$_3$—W$_{0.71}$Mo$_{0.29}$O$_3$ and NiO electrodes offers a remarkable electrochemical performance capable of being coloured in just 1 min under −2.5V to light an LED for 10 min. This design concept may facilitate exciting opportunities for electrochromic applications of solution-processed MoO$_3$ electrodes, especially for the development of MoO$_3$-based low-cost multifunctional ESS windows.

Example 2

The second example of a suitable embodiment uses a first EC layer 24 fabricated from Ti-substituted tungsten molybdenum oxide (Mo/Ti:WO3, MTWO). Aqueous MTWO colloid is synthesized by sequentially exchanging W$^{6+}$/Mo$^{6+}$ with Ti$^{4+}$ via a wet-chemical doping route. The similar ionic radii size of W$^{6+}$ (60 pm), Mo$^{6+}$ (59 pm), and Ti$^{4+}$ (60.5 pm), allows partial-substitution of the Ti$^{4+}$ ions into the W$^{6+}$/Mo$^{6+}$ sites, while preserving the original W$_{0.71}$Mo$_{0.29}$O$_3$ perovskite-like (ABO$_3$) structure with vacant A sites. Notably, the doping process may introduce cationic vacancies that act as intercalation sites to unlock the electrochemical activity towards Zn$^{2+}$ ions. Shown in FIG. 8, the vacant A sites and cationic vacancies in MTWO lattice provide rigid channels for Zn$^{2+}$ ion intercalation in Zn/MTWO battery system. The present example using MTWO exhibits a high gravimetric capacity of 166 mAh/g the highest capacity that has been observed for divalent ion storage in WO$_3$-based materials. Furthermore, for electrochromic applications, the MTWO colloid of the present example may suppress the formation of large nanowire clusters during solution-processed film deposition which reduces light scattering and yields a high optical transmittance. The spray-coated MTWO cathode exhibits a greatly improved optical contrast of 76%, and a high areal capacity of 260 mAh/m². Such an optical contrast is 5 times higher than that of a W$_{0.71}$Mo$_{0.29}$O$_3$ electrode and is the highest optical contrast for an electrochromic battery reported to date. As a proof of concept, the enhanced battery and electrochromic performance is demonstrated in a ZIEB prototype, which exhibits a high areal capacity of 150 mAh/m², an open-circuit potential (OCP) of more than 1.2 V, and a high optical contrast of 62%. The demonstrated high-performance rechargeable aqueous ZIEB, is able to power a 0.5V light emitting diode (LED) for more than 40 minutes, remains stable under continuous cycling, and may be self-recharged by the spontaneous extraction of Zn$^{2+}$ ions from colored MTWO cathode.

Results

Figure 8:
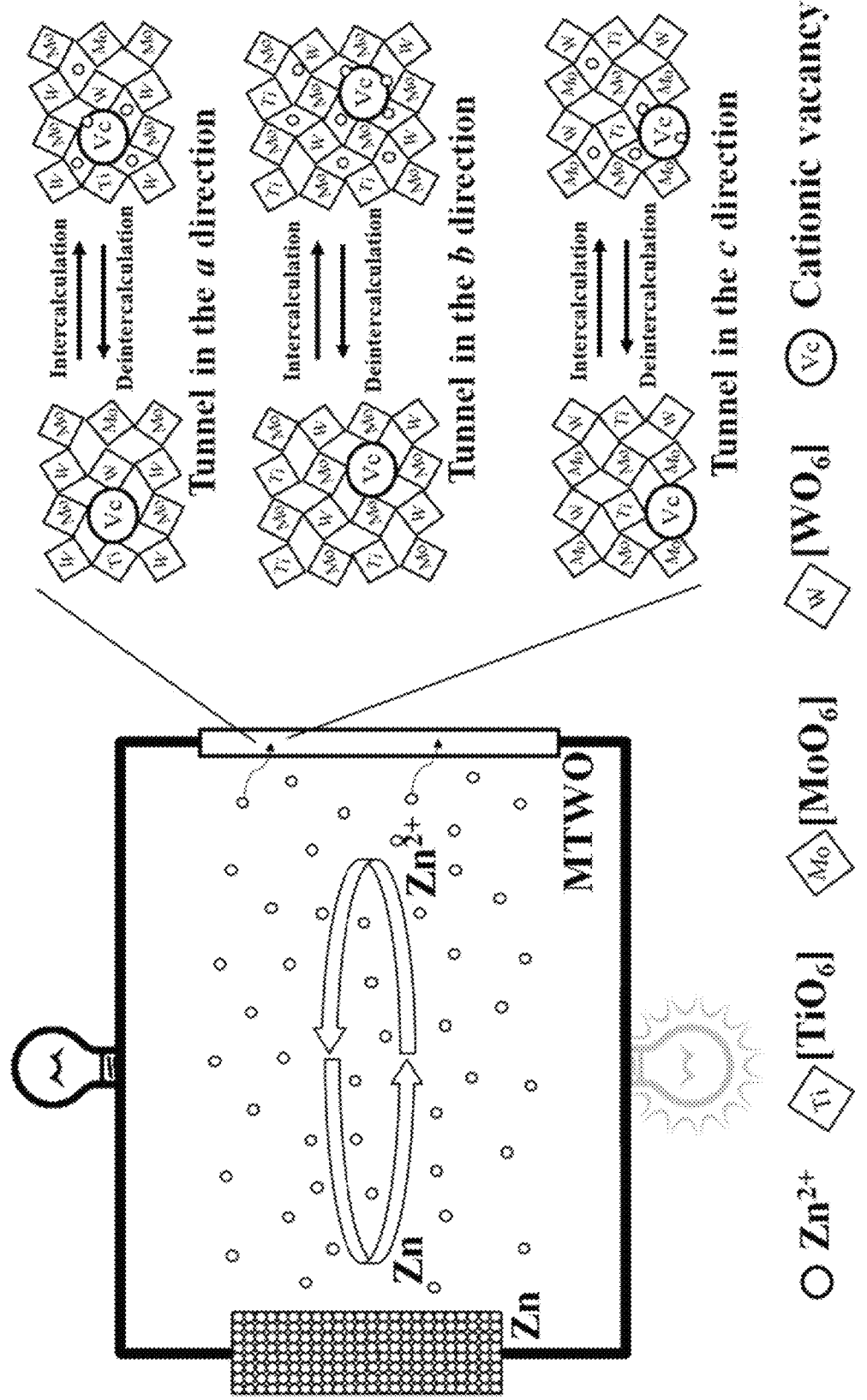
FIG. 8 is an illustration of the Zn/MTWO battery chemistry showing a schematic of the rechargeable battery system and an illustration of possible $Zn^{2+}$ ion intercalculation/deintercalculation.

The MTWO nanowire sponges may be prepared using a liquid-phase doping method with a low-temperature synthesis and high yield, discussed in the Methods below. X-ray diffraction (XRD) analyses, shown in FIG. 16a and FIG. 16b, reveal that the Ti/Mo doping leads to a transformation of the orthorhombic hydrated WO$_3$ to monoclinic phase (JCPDS No. 01-076-1279). The XRD patterns for MTWO and W$_{0.71}$Mo$_{0.29}$O$_3$ correspond well to a perovskite-like (ABO$_3$) structure (P21/n) with vacant A-sites. Shown in FIG. 16b, the XRD peak at 28.5° attributed to the (−112) plane of the MTWO sample is stronger than that of W$_{0.71}$Mo$_{0.29}$O$_3$. This is caused by the local lattice distortions of [WO$_6$] and [MoO$_6$] octahedras due to the substitution of Ti$^{4+}$ cations. Notably, there are no TiO$_2$ or MoO$_3$ impurity signatures observed in the XRD patterns, which indicates that the Ti$^{4+}$ cations have successfully been integrated into the lattice of the W$_{0.71}$Mo$_{0.29}$O$_3$. Furthermore, MoO$_3$, WO$_3$, and TiO$_2$ all adopt the metal-oxygen octahedral structure with shared corners, which facilitates the formation of a MTWO solid solution (i.e. mixed oxides) rather than multiphase mixture of MoO$_3$, WO$_3$ and TiO$_{2.29}$ The lattice parameters could increase upon Ti substitution owing to the difference in the ionic radii of W$^{6+}$/Mo$^{6+}$ (60/59 pm) and Ti$^{4+}$ (60.5 pm). This may result in enlarged vacant A-sites within the perovskite-like (ABO$_3$) structure, and provides channels for Zn$^{2+}$ ion intercalation along all axes of the unit cell as shown in FIG. 8, which favors the Zn$^{2+}$ storage in MTWO.

Figure 9A:
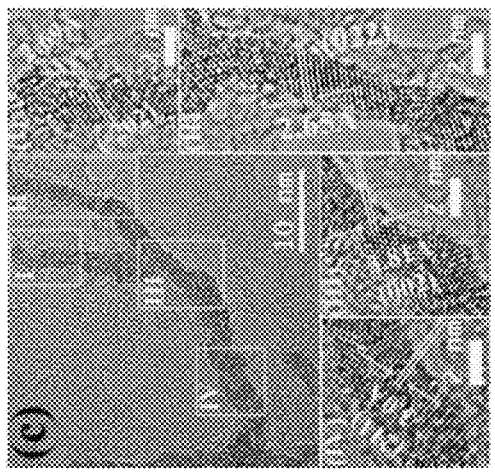
FIG. 9a is a TEM image of the MTOW.
Figure 9B:
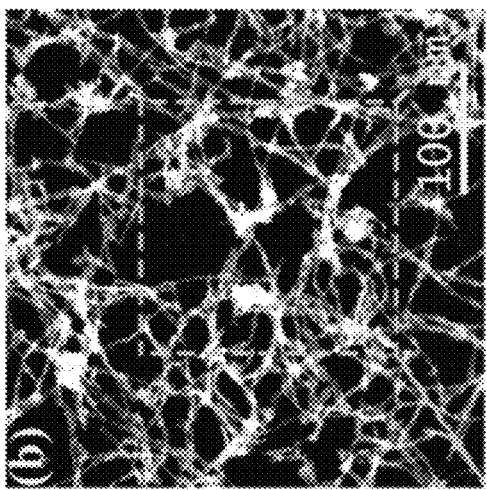
FIG. 9b is a DF-STEM image of the MTOW.
Figure 9C:
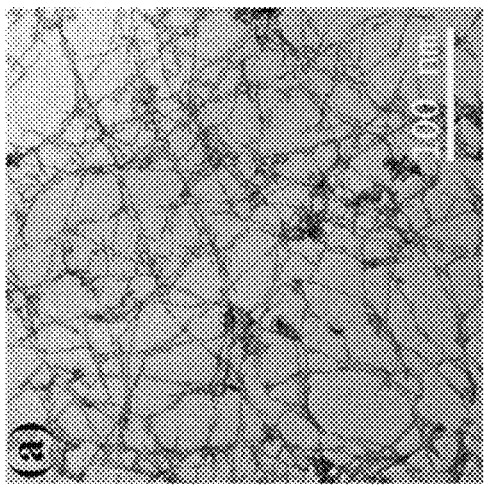
FIG. 9c is a HR-STEM image of the MTOW.
Figure 9D:
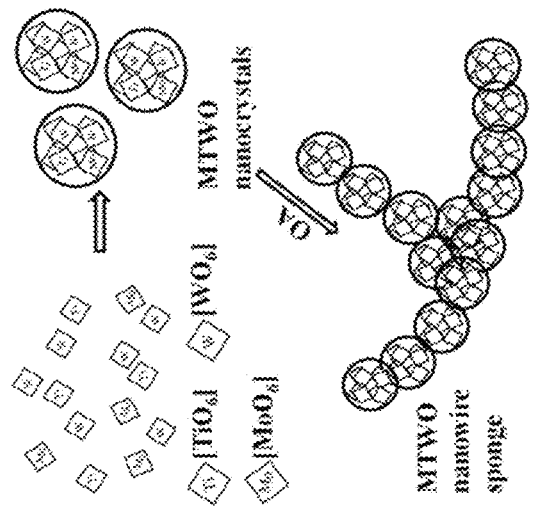
FIG. 9d is an atomic resolution image of the MTOW.

Transmission electron microscopy (TEM) and dark-field scanning transmission electron microscope (DF-STEM) images shown in FIGS. 9a and 9b depict the MTWO nanowire sponge-like pattern structure. The hydrated WO$_3$ exhibits a plate-like structure having lateral size larger than 200 nm, while the $W_{0.71}Mo_{0.29}O_3$ exhibits an ultrafine web of nanowire bundles. The different morphologies of the materials suggest that doping significantly decreases the particle size, which may enhance electrolyte accessibility and reduce ion diffusion length within the material. The high resolution TEM (HR-TEM) image of MTWO, shown in FIG. 9c, affirms that each single nanowire is composed of anisotropic nanocrystals, suggesting that the nanowires are formed through oriented attachment process. Previously, the enhanced electrochromic performance of doped materials was attributed to the morphology and size difference, however, the presence of defects, particularly cationic vacancies in metal oxides, have also shown to exert an effect on the performance of electrochemical energy storage devices. To probe the defects induced by doping, an atomic-resolution image of MTWO was obtained and is shown in FIG. 9d, which allows direct visualization of the cationic vacancies. The variation in atomic column intensity may correspond to a variation in the W, Mo, or Ti-sites, and hence points to the presence of cationic vacancies. The intensity variation between atomic columns is emphasized in the line profile shown in inset of FIG. 9d. The lateral size of the cationic vacancy is 0.5 nm, which is much larger than the ionic radii of $Zn^{2+}$ (74 pm), suggesting that the cationic vacancy could also act as intercalation sites for $Zn^{2+}$ ions and allows a much greater capacity to be obtained compared to pure $WO_3$.

Figure 9E:
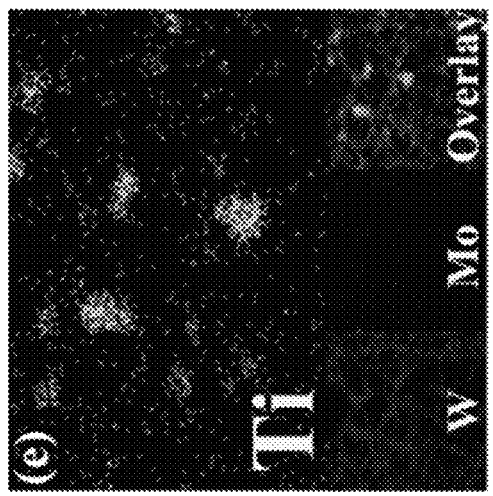
FIG. 9e is EDS elemental mapping results for MTWO.
Figure 9F:
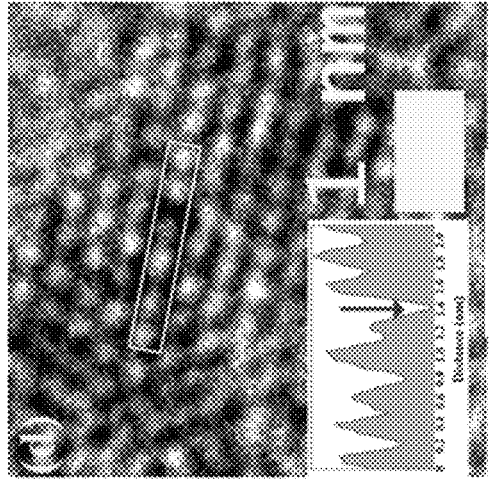
FIG. 9f is a schematic illustration of the formation of nanowire sponges.

Energy dispersive spectroscopy (EDS) elemental mapping, as displayed in FIG. 9e, show that molybdenum, tungsten, titanium and oxygen elements are detected in the sample, confirming that $Ti^{4+}$ cations have doped into $[WO_6]$ and $[MoO_6]$ octahedras. It should be noted that most of Ti element is observed in the nanowire joint area, indicating that $[TiO_6]$ octahedras easily bind together and serve as joints to form the nanowire sponge-like structure, rather the nanowire bundles formed in $W_{0.71}Mo_{0.29}O_3$. The formation process of MTWO nanowire sponge is schematically illustrated in FIG. 9f, where self-assembled MTWO nanowires are joined together to form nanowire sponges due to the Ti-substitution.

Doping induced cation-deficiency and morphology evolution may make the as-synthesized materials exhibit improved $Zn^{2+}$ ion storage capability. The integrated cathodic-current densities in the cyclic voltammograms (CVs) of monoclinic $W_{0.71}Mo_{0.29}O_3$ and MTWO, tested in 1M $ZnSO_4$, can be shown to be larger compared to the orthorhombic hydrated $WO_3$, which may indicate a larger amount of $Zn^{2+}$ ions intercalated to the materials. This confirms that such Ti/Mo doping may induce highly improved $Zn^{2+}$ ion storage capability, and indicates that monoclinic phase $WO_3$-based materials have lower activation energies for interfacial charge-transfer and solid-state diffusion. The MTWO delivers a stable high gravimetric capacity of 166 mAh/g after 60 s when connected in a short circuit configuration, which is almost 10 times larger than that of the orthorhombic hydrated $WO_3$, almost five times that of the $WO_3.nH_2O$ triggered by $Mg^{2+}$ ions (35 mAh/g), and higher than spinel $LiMn_2O_4$ (123 mAh/g) as a cathode for Li-ion batteries. Moreover, the optical properties of the colloids may also be altered by doping, which is important for optical coatings and other photonic applications.

The different morphologies of MTWO and $W_{0.71}Mo_{0.29}O_3$ make the colloids exhibit different droplet wetting behaviors. Specifically, the MTWO colloid is found to be easier to deposit uniform films. $W_{0.71}Mo_{0.29}O_3$ nanowires may aggregate into large clusters (as the solvent evaporates), which leads to the formation of nonuniform films. In contrast, the MTWO nanowires spread evenly on the substrate surface without large clusters due to the steric hindrance effect of the sponge-like structure, shown in FIG. 10a and FIG. 10b, resulting in a uniform film. The unique properties of the MTWO colloid make it suitable for spray deposition, which has been proven to be a versatile and facile method to fabricate large-scale films at a fast production speed. Similar to drop-casting, the sprayed droplet evaporation process plays an important role in fabricating spray-coated films. FIG. 10c and FIG. 10d schematically illustrate the spray-assisted self-assembly of MTWO nanowires. After spraying droplets onto ITO glass, the droplet edges become pinned to the ITO substrate when evaporation occurs. The Outward flows drives the MTWO nanowires to the droplet edge, while the Marangoni flows return them to the center of the droplets. Notably, the steric hindrance effect of the MTWO nanowire sponge-like structure impedes the aggregation of MTWO nanowires driven by the Outward flow force, thus making the nanowires spread uniformly in the droplet. The capillary force (F) between nanowires and spray pressure provide compressive pressure to join the sponge nanowires into contact and form a densely packed uniform MTWO film. Conversely, the $W_{0.71}Mo_{0.29}O_3$ nanowires easily aggregate together to form nanowire bundles, suggesting that the outward flows could drive the $W_{0.71}Mo_{0.29}O_3$ nanowires to the droplet edge, resulting in a coarse structure with large clusters that increase the scattering of light from the film. The SEM images of the spray-coated MTWO and $W_{0.71}Mo_{0.29}O$ electrodes can be shown to affirm this interpretation; the MTWO nanowires are densely packed while the $W_{0.71}Mo_{0.29}O_3$ nanowires assemble into large clusters.

Figure 11A:
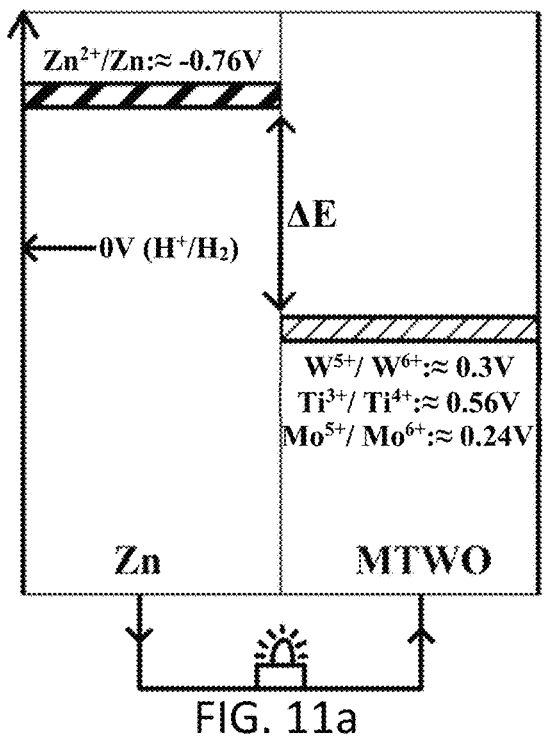
FIG. 11a is a graph of the energy level transition diagram of a Zn anode and MTWO cathode in an example EC device.
Figure 11B:
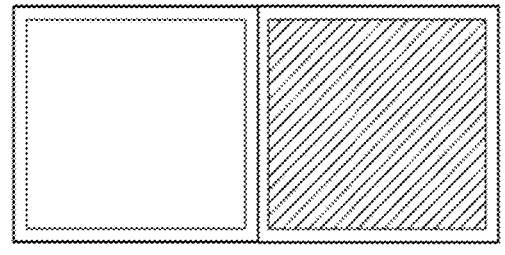
FIG. 11b depicts an example of an EC device before (oxidized) and after (reduced) self-coloring.
Figure 11C:
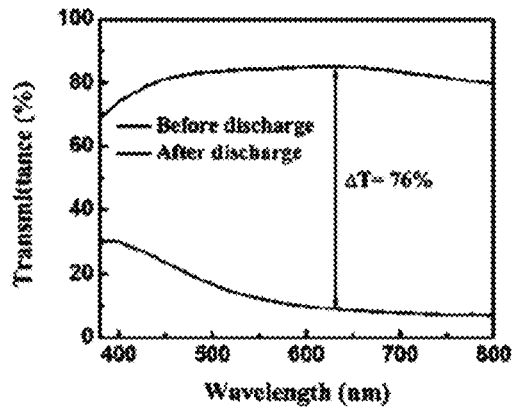
FIG. 11c is a graph depicting the visible-near infrared transmittance spectrum of an example of an EC device measured before and after self-coloring.
Figure 11D:
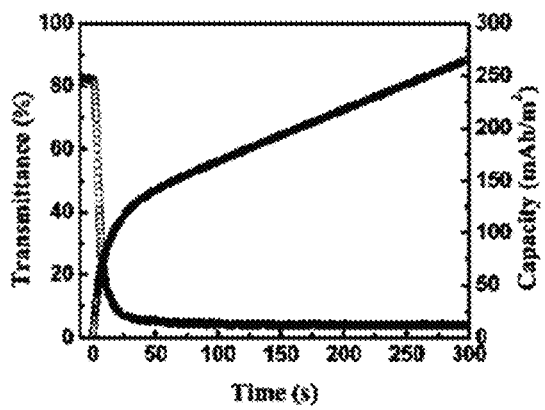
FIG. 11d is a graph depicting the in-situ self-coloring (discharge) process of an example of an EC device.
Figure 12A:
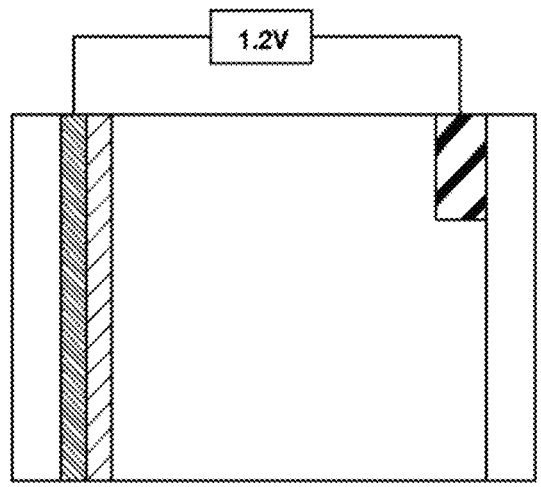
FIG. 12a is a side elevation view of an EC device made up of, from left to right, layers of glass, ITO, MTWO, electrolyte, a Zn electrode, and glass.
Figure 12B:
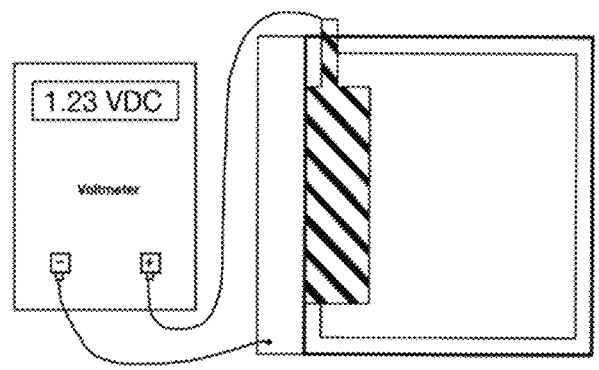
FIG. 12b is a side elevation view of an EC device connected to a voltmeter.

The densely packed nanowires in the spray-coated MTWO electrode may reduce light scattering and improve its optical transmittance, as compared to spray-coated $W_{0.71}Mo_{0.29}O_3$ electrode having large clusters. The spray-coated MTWO electrode offers the additional advantage of high optical transmittance, which is particularly valuable in optoelectronics. Due to the difference in redox potential between the MTWO (>0.24V vs SHE) and Zn (~0.76V vs SHE), such a material makes an excellent cathode for ZIEBs. As schematically illustrated in FIG. 11a, the redox potential difference ($\Delta E$) serves as a driving force to cause Zn to release electrons and form $Zn^{2+}$ ions when the two materials are connected together, while MTWO acquires these electrons and hosts the $Zn^{2+}$ ions within its rigid tunnels. This transfer generates an electrical current that is similar to the discharge process of traditional Zn-ion batteries, and additionally, the intercalation of $Zn^{2+}$ into MTWO induces a color change (defined as self-coloration) due to the reductions of $W^{6+}$, $Mo^{6+}$ and $Ti^{4+}$. Digital photographs of the spray-coated MTWO cathode (FIG. 11b) show a distinct color change before and after the spontaneous intercalation process of $Zn^{2+}$ into MTWO (self-coloration). FIG. 11c shows the change in optical transmittance of the MTWO cathode when connected to a piece of Zn foil in a cuvette filled with 1M $ZnSO_4$ electrolyte. The MTWO cathode exhibits an optical contrast ($\Delta T$) of ~76% at 632.8 nm without background correction. This optical contrast may be five times higher than that of a $W_{0.71}Mo_{0.29}O_3$ cathode, and is the highest of any reported electrochromic battery to date. The in-situ self-coloring process ($Zn^{2+}$ ion intercalation) of the MTWO cathode is shown in FIG. 11d. Notably, the self-coloration time, defined as the time required for the transmission to change by 90% of the maximum optical contrast, is measured to be 14 seconds, which is much faster than the coloration time of a monoclinic $WO_{3-x}$ nanowire electrochromic film triggered by an external voltage.

Figure 11E:
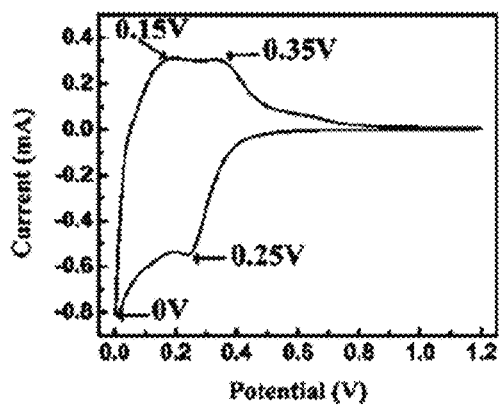
FIG. 11e is a CV curve of an example of a spray-coated MTWO electrode tested in 1M ZnSO4.

Additionally, the areal capacity of the spray-coated MTWO film may be approximately 260 mAh/m$^2$ after 300 s, which is 10 times higher than a $W_{18}O_{49}$ nanowire electrochromic supercapacitor tested in 1 M aqueous $H_2SO_4$. FIG. 11e represents the CV of the spray coated MTWO cathode in a 2-electrode configuration. The two pairs of redox peaks around 0.25/0.35 V and 0/0.15 V are attributed to a two-step reaction associated with $Zn^{2+}$ ion intercalation and extraction through the MTWO lattice. It is worth noting that the spray-coated MTWO electrode may reversibly switch its transmittance via applying external voltages, which leads to the inference that the MTWO electrode can be recharged by an external voltage.

Figure 12C:
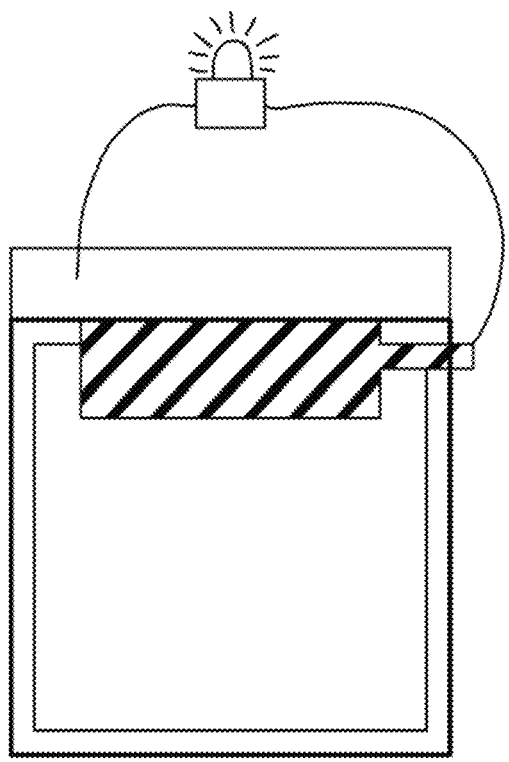
FIG. 12c is a top plan view of the EC device in a high transparency optical state and discharging through an LED.
Figure 12D:
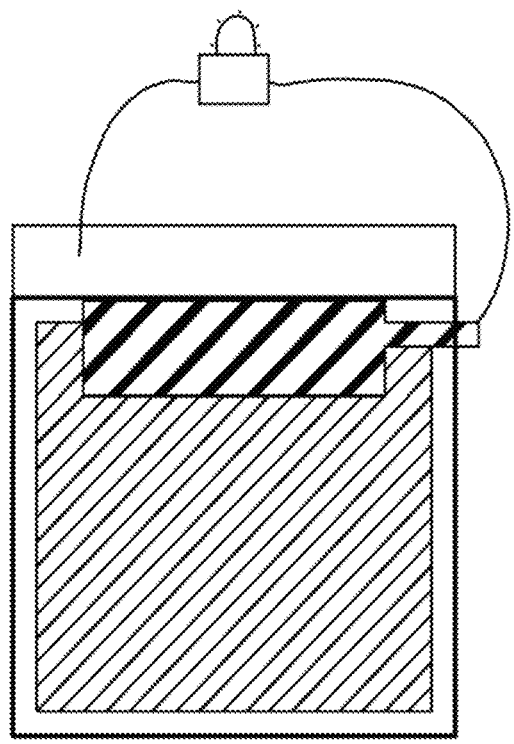
FIG. 12d is a top plan view of the EC device in a low transparency optical state.

Previously reported studies regarding electrochromic batteries demonstrate devices that operate in an open system, and with a special charging strategy (i.e., introducing $H_2O_2$ or $O_2$ to the system). The present spray-coated MTWO cathode, triggered by $Zn^{2+}$ ion intercalation, can be easily recharged by an external voltage, and can function in a closed system with an aqueous electrolyte, due to the lower redox potential of $Zn^{2+}$/Zn. A sealed prototype ZIEB (5×5 cm$^2$) was assembled to further evaluate its practical application as an electrochromic battery, and is shown schematically in FIG. 12a. Notably, in comparison with previously reported electrochromic batteries operated in an open system, the sealed prototype is portable, and thus much more practical for industrial applications. The ZIEB is shown to be transparent in FIG. 12b, indicating it is fully charged, with an open-circuit potential (OCP) of 1.23V. The OCP is slightly higher than the reported $Al^{3+}$ based electrochromic battery, despite the Al anode has a larger standard electrode potential. The transparent ZIEB can light an LED (0.5 V regulated) for more than 40 minutes until depleted/colored, as shown in FIG. 12c and FIG. 12d.

Figure 13A:
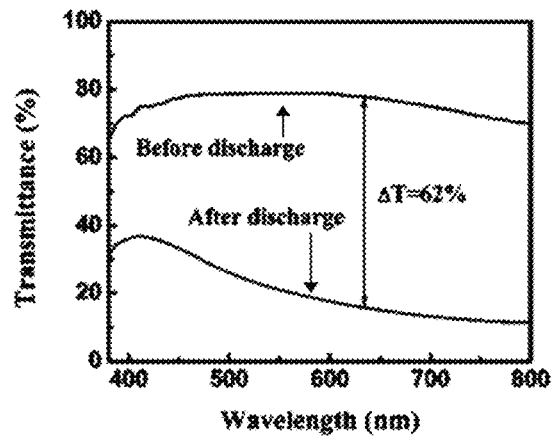
FIG. 13a is a graph showing the visible-near infrared transmittance spectrum of an example of an EC device measured before and after discharging through an LED.
Figure 13B:
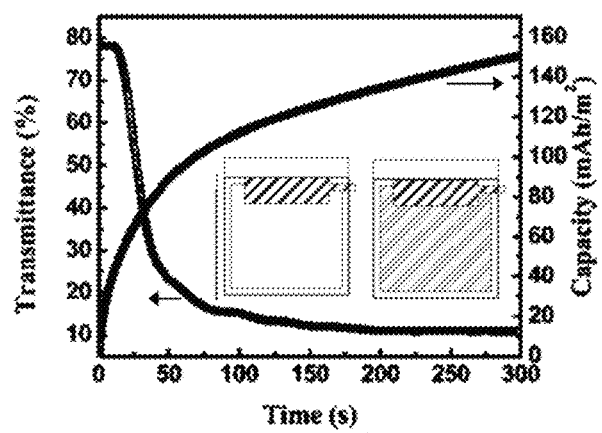
FIG. 13b is a graph of an In-situ self-coloring process of an example of an EC device when directly connecting the anode and the cathode, where the inset depicts the device before (left) and after (right) short circuit discharge.
Figure 13C:
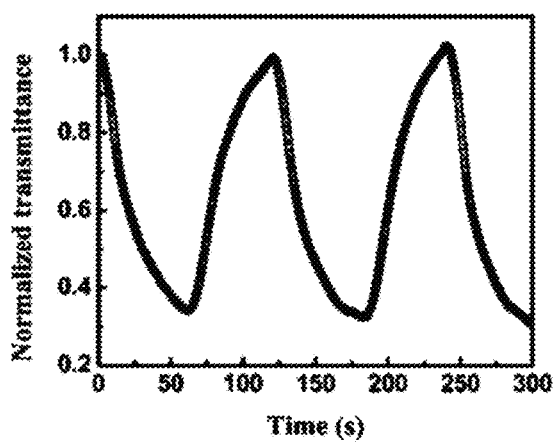
FIG. 13c is a graph depicting reversible switching of an example of an EC device.
Figure 13D:
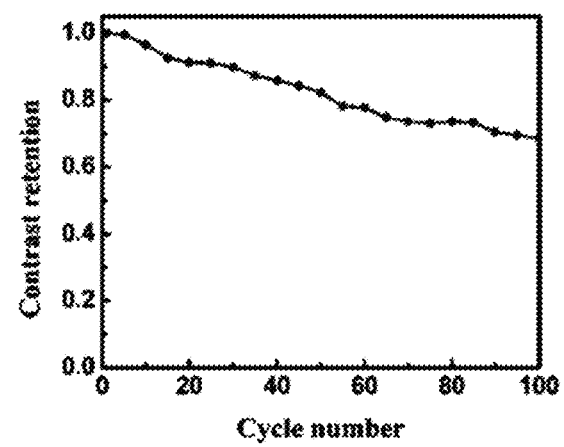
FIG. 13d is a graph depicting the cycle performance of an example of an EC.
Figure 14:
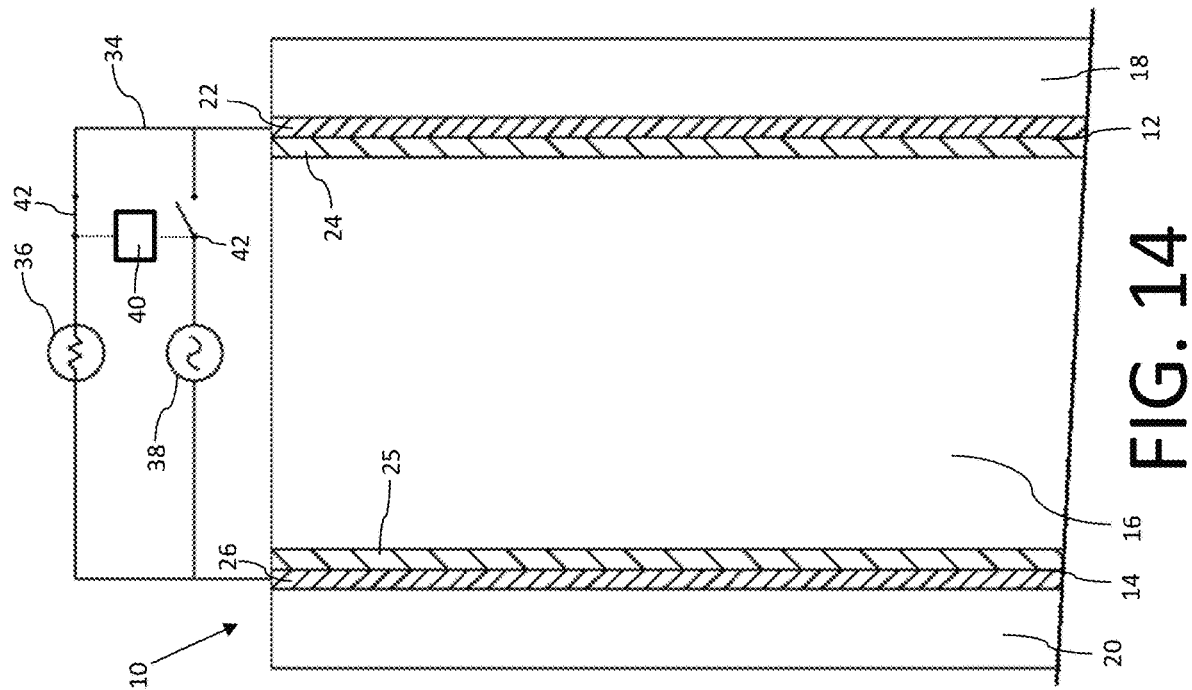
FIG. 14 is a schematic diagram of an EC device with EC layers at both electrodes.
Figure 16B:
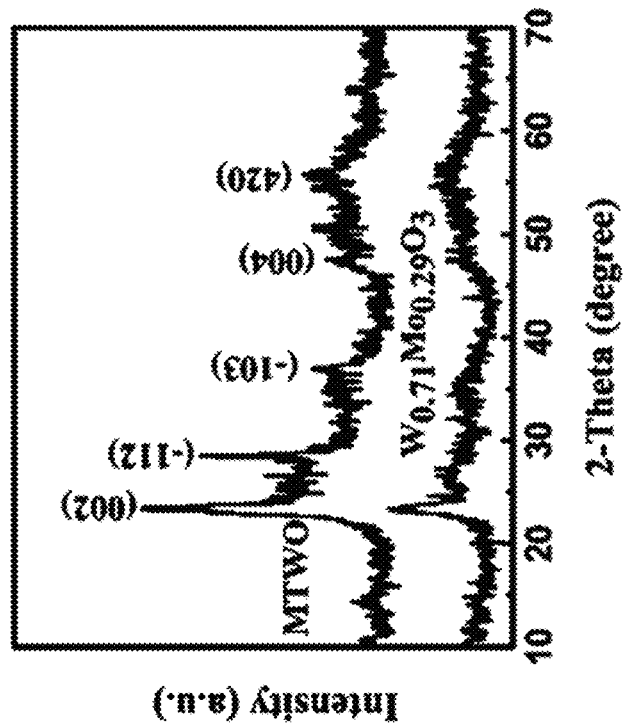
FIG. 16b is a graph depicting XRD patterns of $WO_3$ doped with different elements.
Figure 16A:
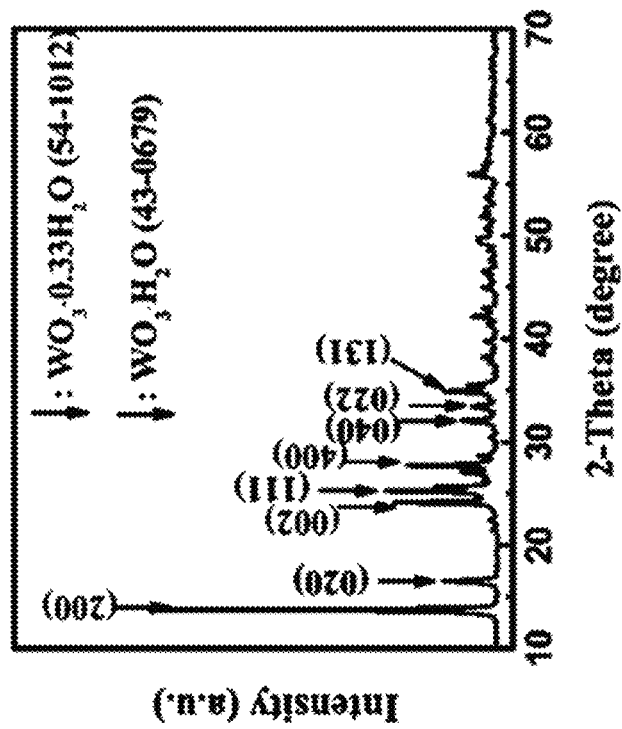
FIG. 16a is a graph depicting XRD patterns of hydrated $WO_3$ doped with different elements.

The optical contrast of the ZIEB may be about 62% between the fully charged and discharged states after lighting the LED, as shown in FIG. 13a. This difference in contrast from the MTWO/Zn system tested in cuvette is attributed to the transmittance loss of the sealing counter glass. FIG. 13b shows the in-situ self-coloring process of the aqueous ZIEB, with a coloration time of 17 s, and areal capacity of about 150 mAh/m$^2$ after 300 s. Even though the coloration time and areal capacity show a slight decay compared to the MTWO/Zn system tested in a cuvette, which is attributed to the large size of the MTWO electrode, the coloration time and the areal capacity still exceed that of previously reported electrochromic batteries/supercapacitors. The reversible switching (coloration/bleaching) of the ZIEB, shown in FIG. 13c, was measured by applying square-wave voltages of 0V and 1.2V with a 60 s pulse width, The ZIEB is shown to reversibly switch between different transmittance states, implying a good rechargeable performance. FIG. 13d reveals the high cycle stability of the prototype, 69% of its initial optical contrast is retained after 100 cycles, indicating a better performance compared to previous electrochromic batteries charged by $O_2$ and $H_2O_2$. Moreover, the depleted (colored) ZIEB can also be self-bleached (self-recharged) with a 24 h recovery by spontaneously extracting $Zn^{2+}$ ions, and can again light up the LED for about 30 min. The ZIEB may self-bleach through thermal activation of ions.

In summary, the second example is a rechargeable aqueous electrochromic battery utilizing a novel Ti-substituted tungsten molybdenum oxide (MTWO) based $Zn^{2+}$ ion intercalation cathode. The MTWO colloid with cationic vacancies was successfully designed to unlock the electrochemical activity of $Zn^{2+}$ ions, and can be simply formed into a cathode for Zn/MTWO battery chemistry. The MTWO cathode, upon $Zn^{2+}$ ion insertion, exhibits the largest optical contrast (76%) of any electrochromic battery, as well as a high areal capacity (260 mAh/m$^2$ after 300 s). The second suitable embodiment further demonstrates a Zn-ion electrochromic battery (ZIEB) prototype that delivers a high open circuit potential (1.2 V), outstanding electrochemical and optical performance, and good continuous cycling stability. This ZIEB may be a promising technology for developing largescale next-generation energy storage systems. In addition to the promising application of aqueous Zn-ion electrochromic batteries, the use of cation-substitution provides new insights to employ defect-based chemistry to design advanced electrode materials for selected electropositive ion insertion, and hence offers exciting possibilities for the development of novel electrochemical devices.

Methods:

Synthesis of Colloids:

The MTWO colloid may be fabricated according to the following procedure: In a typical procedure, $H_2WO_4$ (3 g), $MoO_3$ (0.86 g) and synthesized amorphous $TiO_2$ (0.695 g) were dissolved in 36 mL $H_2O_2$ (30 wt %) under stirring and heating at 95° C. Then, the solution was diluted to form the precursor with ethylene glycol (EG, 84 mL). Afterward, the precursor (100 mL) and EG (100 mL) were added into a 250-mL flask and refluxed at 120° C. for 24 h. After performing the reaction, the as-synthesized product was thoroughly washed with distilled water, then dispersed in DI water to form a MTWO colloid. For comparison, the $W_{0.71}Mo_{0.29}O_3$ colloid and $WO_3$ dispersion were synthesized without introducing Ti and Mo in the reaction precursor.

Solution Process Fabrication of Cathodes:

In order to calculate gravimetric capacities of the as-synthesized colloidal materials, a drop-casting method was used to fabricate cathodes. 0.2 mL of MTWO colloid, $W_{0.71}Mo_{0.29}O_3$ colloid, and $WO_3$ dispersion were drop-casted onto PEI-treated ITO glass covering an 8×35 mm2 area. The concentrations of the colloids used for drop-casting were all 1.0 mg/mL. The large-scale MTWO and $W_{0.71}Mo_{0.29}O_3$ cathodes were prepared by a high-throughput spray coating process. The 1 mg/mL of MTWO and $W_{0.71}Mo_{0.29}O_3$ colloid were deposited on ITO glass substrates (5×5 cm$^2$) at room temperature. All the spray-coated samples were post-annealed in air at 60° C. for 24 hr.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. An electrochromic (EC) device comprising:
    a first electrode and a second electrode separated by an electrolyte, wherein:
        the first electrode comprises an electrochromic (EC) layer comprising a compound having a formula $A_iB_jO_k$, where A comprises one or more elements selected from a group consisting of W, Mn, Mo, Co, Ni, Cs, and Zn, where B is different than A and comprises one or more elements selected from a group consisting of Mo, Ti, Nb, and V, where i and j have values that are greater than 0, and where k is a stoichiometric value that balances the formula;

A is selected such that the EC layer has an improved optical contrast relative to $B_jO_k$ and B is selected such that the EC layer has an improved specific charge capacity relative to $A_iO_k$; and wherein the EC layer has an optical contrast of at least 40% between a charged state and an uncharged state and a specific charge capacity of at least 40 mAh/g.

2. The electrochromic device of claim 1, wherein A comprises W and B comprises Mo.

3. The electrochromic device of claim 1, wherein the compound has the chemical formula $W_{0.71}Mo_{0.29}O_3$.

4. The electrochromic device of claim 1, wherein the second electrode comprises a second EC layer.

5. The electrochromic device of claim 1, wherein the compound of the EC layer comprises nanostructured particles.

6. The electrochromic device of claim 1, wherein the EC layer further comprises an additive compound.

7. The electrochromic device of claim 6, wherein $C_lO_m$ is the additive compound such that the first EC layer has a formula $C_lO_m$-$A_iB_jO_k$, where C comprises one or more elements selected from a group consisting of W, Mn, Mo, Co, Ni, Cs, Zn, Ti, Nb, and V, l has a value of greater than 0, and m is a stoichiometric value that balances the formula.

8. The electrochromic device of claim 7, wherein $C_lO_m$ is selected to increase the specific charge capacity of the EC layer relative to $A_iB_jO_k$.

9. The electrochromic device of claim 6, wherein the additive compound comprises nanostructured particles.

10. The electrochromic device of claim 9, wherein the additive compound comprises nanostructured $W_{0.71}Mo_{0.29}O_3$ particles having at least one dimension that is less than or equal to 1 µm and the additive compound comprises nanostructured $MoO_3$ particles having at least one dimension that is less than or equal to 1 µm.

11. The electrochromic device of claim 6, wherein the additive compound comprises an organic compound.

12. The electrochromic device of claim 1, wherein at least one of the first electrode, the second electrode, and the electrolyte comprises an organic compound.

13. The electrochromic device of claim 1, wherein the EC device stores a potential difference.

14. The electrochromic device of claim 1, wherein the EC device transitions from an uncharged state to a charged state via thermal activation.

15. In combination:

an electrochromic (EC) device comprising:

a first electrode and a second electrode separated by an electrolyte; wherein:

the first electrode comprises an electrochromic (EC) layer comprising a compound having a formula $A_xB_yO_n$, where A comprises an element selected from a group consisting of W, Mn, Mo, Co, Ni, Cs, and Zn, and x has a value that is greater than 0, and where B comprises an element selected from a group consisting of Mo, Ti, Nb, and V and y has a value that is greater than 0, and n is a stoichiometric value that balances the formula;

A is selected such that the EC layer has an improved optical contrast relative to $B_jO_k$ and B is selected such that the EC layer has an improved specific charge capacity relative to $A_iO_k$; and wherein the EC layer has an optical contrast of at least 40% between a charged state and an uncharged state and a specific charge capacity of at least 40 mAh/g; and a voltage source connected to selectively apply a potential difference between the first electrode and the second electrode such that applying the voltage source to the first and second electrodes causes the EC device to enter a charged state, and changes an optical state of the EC.

16. The combination of claim 15, further comprising an electrical device selectively connected between the first electrode and the second electrode, such that connecting the electrical device between the first and second electrode discharges the EC device reverses the optical state of the EC device and puts the EC device into a discharged state.

17. The combination of claim 16, wherein the electrical device is a light emitting diode.

18. The combination of claim 16, further comprising a controller programmed to selectively connect and disconnect the voltage source and the electrical device.

19. A method of changing an optical state of an electrochromic (EC) device having a first optical state and a second optical state, the method comprising the steps of:

providing an electrochromic (EC) device comprising:

a first electrode and a second electrode separated by an electrolyte, the first electrode comprises an electrochromic (EC) layer comprising a compound having a formula $A_xB_yO_n$, where A comprises an element selected from a group consisting of W, Mn, Mo, Co, Ni, Cs, and Zn, and x has a value that is greater than 0, and where B comprises an element selected from a group consisting of Mo, Ti, Nb, and V and y has a value that is greater than 0, and n is a stoichiometric value that balances the formula;

wherein A is selected such that the EC layer has an improved optical contrast relative to $B_jO_k$ and B is selected such that the EC layer has an improved specific charge capacity relative to $A_iO_k$;

switching the EC from the first optical state to the second optical state by causing electrical current to flow from the first electrode to the second electrode;

switching the EC device from the second optical state to the first optical state by causing electrical current to flow from the second electrode to the first electrode; and powering an electrical device using current flowing from the first electrode to the second electrode or from the second electrode to the first electrode.

20. The method of claim 19, wherein causing electrical current to flow comprises applying a voltage difference from a voltage source between the first electrode and second electrode.

21. The method of claim 19, wherein the EC layer has an optical contrast of at least 40% between a charged state and an uncharged state and a specific charge capacity of at least 40 mAh/g.

22. The method of claim 19, wherein the EC layer further comprises an additive compound having a formula $C_lO_m$, such that the first EC layer has a formula $C_lO_m$-$A_iB_jO_k$, where C comprises one or more elements selected from a group consisting of W, Mn, Mo, Co, Ni, Cs, Zn, Ti, Nb, and V, l has a value of greater than 0, and m is a stoichiometric value that balances the formula.

23. A method of fabricating an electrochromic (EC) device comprising the steps of:
- providing a conductive substrate comprising a conductive layer;
- providing a suspension of an electrochromic (EC) compound in a liquid, the EC compound having the formula $A_xB_yO_n$, where A comprises an element selected from a group consisting of W, Mn, Mo, Co, Ni, Cs, and Zn, and x has a value that is greater than 0, and where B comprises an element selected from a group consisting of Mo, Ti, Nb, and V and y has a value that is greater than 0, and n is a stoichiometric value that balances the formula, wherein:
  - A is selected such that an EC layer formed from the EC compound has an improved optical contrast relative to $B_jO_k$, and B is selected such that the EC layer has an improved specific charge capacity relative to $A_iO_k$;
- coating the conductive layer with the suspension of the EC compound;
- forming a first electrode by evaporating the liquid to form the EC layer from the EC compound on top of the conductive layer; and
- providing a second electrode opposite to the first electrode relative to an electrolyte such that the electrolyte is adjacent to the EC layer.

24. The method of claim 23, wherein coating the conductive layer with the suspension of the EC compound comprises drop-casting, spray-coating, or dip coating.

25. The method of claim 23, wherein the suspension of the EC compound comprises nanostructured particles suspended in liquid.

26. The method of claim 23, wherein evaporating the liquid comprises annealing the solid EC layer.

27. The method of claim 23, wherein the suspension of the EC compound is formed by mixing one or more precursor chemical solutions in the liquid.

28. The method of claim 23, wherein the conductive substrate is transparent.

29. The method of claim 23, further comprising the step of mixing the suspension of the EC compound with a suspension of an additive compound, the additive compound having a formula $C_lO_m$ where C comprises one or more elements selected from a group consisting of W, Mn, Mo, Co, Ni, Cs, Zn, Ti, Nb, and V, l has a value of greater than 0, and m is a stoichiometric value that balances the formula.

30. The method of claim 23, further comprising the step of alternating coating layers of the EC compound and an additive compound.

31. The method of claim 23, wherein the additive compound comprises poly(3,4-ethylenedioxythiophene) polystyrene sulfonate.

32. The combination of claim 15, wherein the EC layer further comprises an additive compound having a formula $C_lO_m$ such that the first EC layer has a formula $C_lO_m$-$A_iB_jO_k$, where C comprises one or more elements selected from a group consisting of W, Mn, Mo, Co, Ni, Cs, Zn, Ti, Nb, and V, l has a value of greater than 0, and m is a stoichiometric value that balances the formula.

33. The method of claim 23, wherein the EC layer has an optical contrast of at least 40% between a charged state and an uncharged state and a specific charge capacity of at least 40 mAh/g.

* * * * *